(12) United States Patent
Chang

(10) Patent No.: US 10,717,493 B2
(45) Date of Patent: Jul. 21, 2020

(54) BALANCING TRANSPORTER

(71) Applicant: Fu-Long Chang, Chiayi (TW)

(72) Inventor: Fu-Long Chang, Chiayi (TW)

(*) Notice: Subject to any disclaimer, the term of this patent is extended or adjusted under 35 U.S.C. 154(b) by 0 days.

(21) Appl. No.: 16/410,482

(22) Filed: May 13, 2019

(65) Prior Publication Data
US 2020/0039599 A1 Feb. 6, 2020

(30) Foreign Application Priority Data

Aug. 4, 2018 (CN) .......................... 2018 1 0881069
Nov. 9, 2018 (CN) .......................... 2018 1 0766517

(51) Int. Cl.
| | |
|---|---|
| B62K 21/12 | (2006.01) |
| B62K 11/00 | (2006.01) |
| B62K 11/02 | (2006.01) |
| B62J 99/00 | (2020.01) |
| B62K 5/01 | (2013.01) |
| B62J 45/20 | (2020.01) |
| B62J 45/40 | (2020.01) |

(52) U.S. Cl.
CPC ............... *B62K 21/12* (2013.01); *B62J 99/00* (2013.01); *B62K 11/007* (2016.11); *B62K 11/02* (2013.01); *B62J 45/20* (2020.02); *B62J 45/40* (2020.02); *B62K 5/01* (2013.01); *B62K 2204/00* (2013.01)

(58) Field of Classification Search
None
See application file for complete search history.

(56) References Cited

U.S. PATENT DOCUMENTS

| | | | |
|---|---|---|---|
| 6,302,230 B1 | 10/2001 | Kamen et al. | |
| 6,581,714 B1* | 6/2003 | Kamen | A63C 17/12 180/19.1 |
| 6,789,640 B1* | 9/2004 | Arling | A63C 17/12 180/282 |
| 7,275,607 B2* | 10/2007 | Kamen | A63C 17/01 180/7.1 |
| 7,717,200 B2* | 5/2010 | Kakinuma | A63C 17/08 180/218 |
| 9,108,675 B2* | 8/2015 | Boyle | B62D 11/02 |
| 9,188,984 B2 | 11/2015 | Kamen et al. | |
| 2001/0014569 A1* | 8/2001 | Baker | A63G 25/00 446/448 |
| 2002/0074179 A1* | 6/2002 | Brandt | B62D 7/1509 180/252 |
| 2018/0111039 A1* | 4/2018 | Wood | A63C 17/12 |

* cited by examiner

*Primary Examiner* — Jacob D Knutson
*Assistant Examiner* — Harold Eric Pahlck, III
(74) *Attorney, Agent, or Firm* — Muncy, Geissler, Olds & Lowe, P.C.

(57) ABSTRACT

A balancing transporter is provided to mitigate occurrence of undesired sudden turning and falling of a user by virtue of various mechanisms that control the source/cause of mistakes and implement post-mistake remedies. Two adjusting members are operated by the user for turning control in a manner that interference between operations on the adjusting members and on handles is prevented. Maximum allowance of difference between wheel speeds is introduced to prevent sudden turns due to inappropriate operation. A rotational interlock unit mechanically enables the adjusting members to rotate in opposite directions to prevent sudden turns. Shock absorption and balance compensation mechanisms are introduced to keep the balancing transporter from tilting.

4 Claims, 24 Drawing Sheets

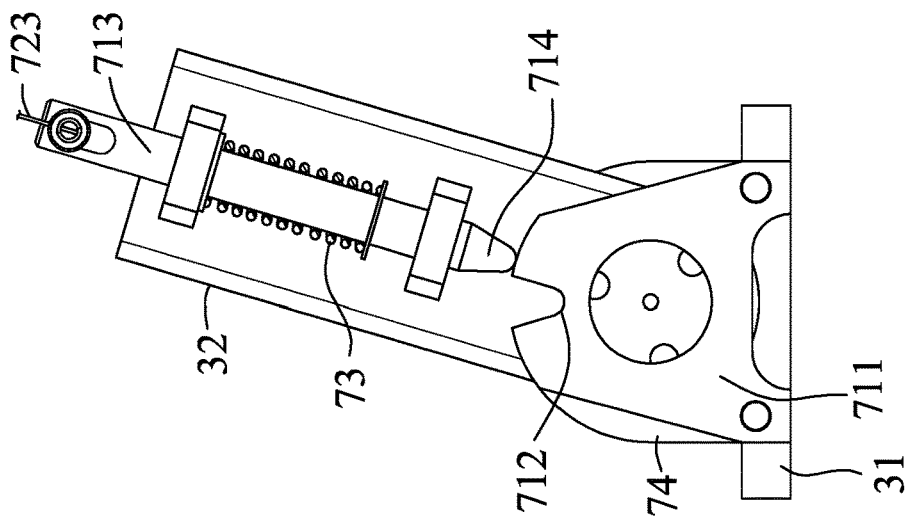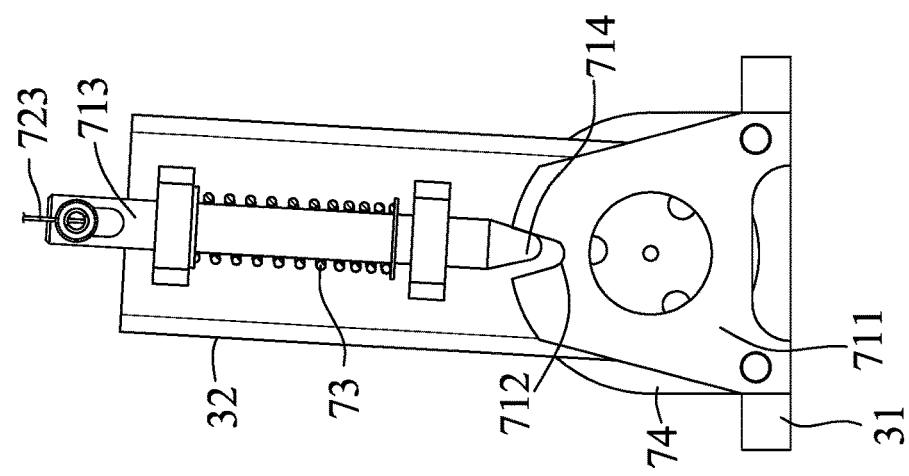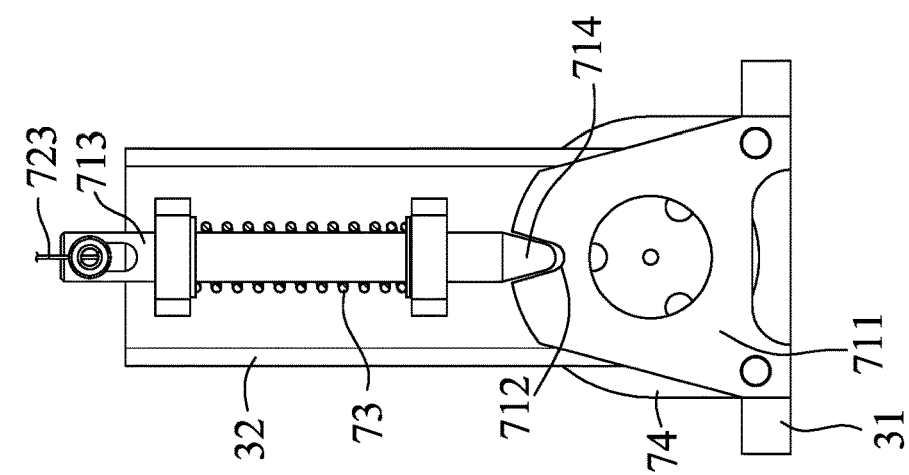
FIG.2

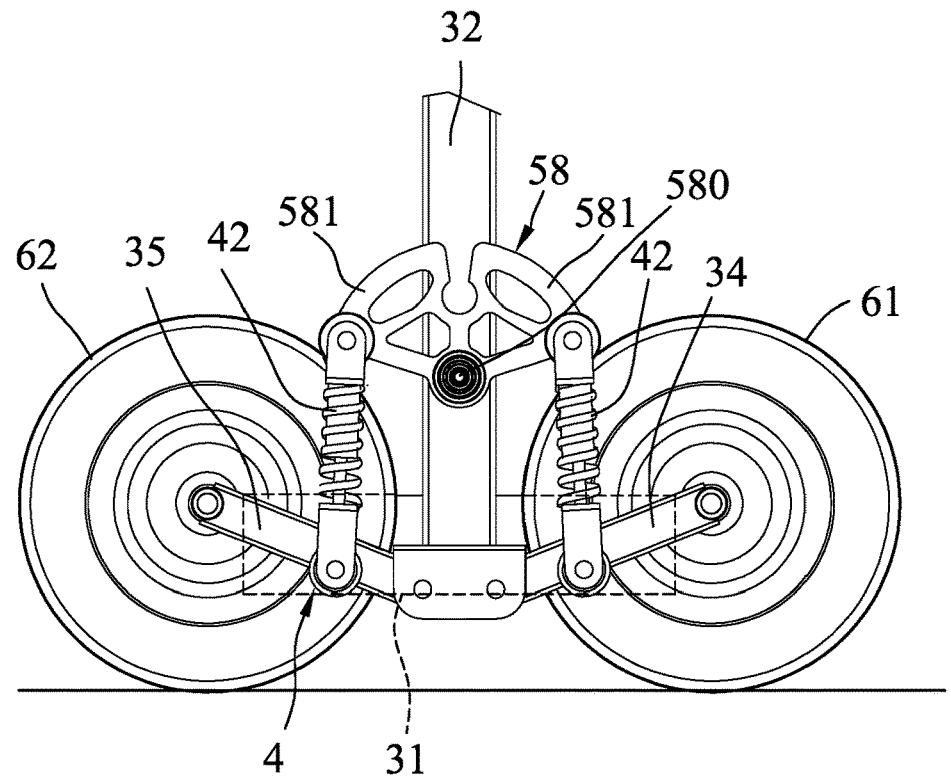
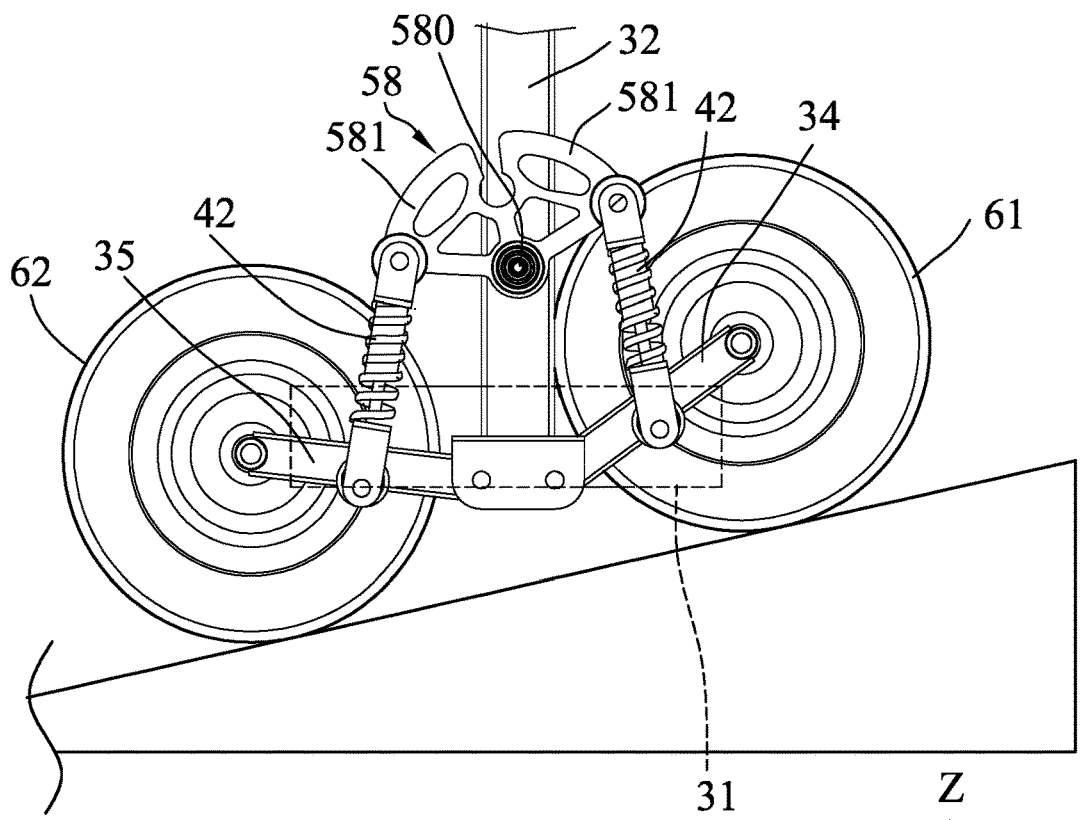
FIG.21

BALANCING TRANSPORTER

CROSS-REFERENCE TO RELATED APPLICATION

This application claims priority to Chinese Patent Application No. 201810881069.8 filed on Aug. 4, 2018 and Chinese Patent Application No. 201810766517.X filed on Nov. 9, 2018.

FIELD

The disclosure relates to a balancing transporter, more particularly to a balancing transporter equipped with handles.

BACKGROUND

A conventional two-wheeled balancing transporter, such as those disclosed in U.S. Pat. Nos. 6,302,230 B1, 9,188,984 B2 and 7,275,607B2, usually includes two wheels, a support platform, and a frame rod mounted on the support platform and bifurcating at a distal end of the frame rod into two handles. The handles are provided for a user of the balancing transporter to hold onto and steer. While riding such a conventional balancing transporter, the user has to stand on a rotating support platform, change exerting forces on the support platform with his/her feet frequently and hold the swiveling handles with caution to thereby prevent overcontrol of or tumbling down from the balancing transporter.

The frame rod formed with the handles is freely movable to the left or right for steering the conventional balancing transporter. Thus, the frame rod cannot be used to assist the user in regaining balance on the support platform. For example, while riding on a bumpy road or making a sharp turn, the user must keep himself balanced, otherwise the user may not properly exert forces on the handles for correct steering; however, quite possibly, when the forces are not properly exerted and cause an unintended turn, the rider may be thrown off the transporter or crash of the transporter may occur. As a result, the conventional balancing transporter may cause severe injuries to the user and damage to itself.

There are five general kinds of drawbacks causing accidents or crash of the conventional balancing transporter, as outlined in the following: A) due to inadequate design or lack of consideration with regards to operation or external interferences, the conventional balancing transporter is easily out of control; B) one of the wheels being stuck or arrested results in an abrupt turn of the balancing transporter; C) the user exerts force on the handles inappropriately causing unintended sudden turn; D) severe shaking to the left and right makes the user lose balance; and E) serious bumping up and down makes the user's feet leave the support platform.

SUMMARY

Therefore, an object of the present disclosure is to provide a balancing transporter for alleviating at least one of the above drawbacks of the conventional balancing transporter.

According to one aspect of the present disclosure, a balancing transporter includes a vehicle frame and a turning control mechanism. The vehicle frame includes a frame unit and a pair of wheels spaced apart from each other. The frame unit includes a frame body that is mounted between the wheels and a frame rod that includes a lower portion pivotally connected to the frame body. The turning control mechanism is mounted to the vehicle frame and includes a limiting unit and a controlling unit. The limiting unit is configured to limit the frame rod to pivot relative to the frame body within a range of angles, and includes a limiting block mounted on one of the frame body and the frame rod, and a movable block mounted on the other one of the frame body and the frame rod and detachably engaging the limiting block. The controlling unit is connected to the movable block and is operable to drive the movable block to move relative to the limiting block so as to adjust the range of angles the frame rod is allowed to pivot relative to the frame body.

According to another aspect of the present disclosure, a balancing transporter includes a vehicle frame and a turning control mechanism. The vehicle frame includes a frame unit and a pair of wheels spaced apart from each other. The frame unit includes two frame bodies that are pivotally connected to each other and that are mounted rotatably and respectively to the wheels. The turning control mechanism is mounted to the vehicle frame and includes a limiting unit and a controlling unit. The limiting unit includes a limiting block and a movable block respectively mounted on the frame bodies. The movable block detachably engages the limiting block. The controlling unit is connected to the movable block and is operable to drive the movable block to move relative to the limiting block so that the frame bodies are allowed to pivot relative to each other when the movable block disengages from the limiting block and that the frame bodies are prevented from pivoting relative to each other when the movable block engages the limiting block.

According to still another aspect of the present disclosure, a balancing transporter includes a vehicle frame, a turning control mechanism and a main control system. The vehicle frame includes a frame unit and a pair of wheels spaced apart from each other and rotatably mounted to opposite sides of the frame unit. The frame unit includes two spaced-apart handles. The turning control mechanism includes two adjusting members and a rotational sensor unit. The adjusting members are rotatably and respectively sleeved on the handles. The rotational sensor unit is mounted on the frame unit for sensing a rotation angle of at least one of the adjusting members relative to the respective one of the handles and outputting a rotation angle signal indicating the rotation angle. The main control system is communicatively connected to the rotational sensor unit and the wheels, and includes a control sub-system and a data storage device. The control sub-system is configured to continuously obtain a current speed of each of the wheels in real time and to determine an adjusting ratio by analyzing the rotation angle indicated by the rotation angle signal received from the rotational sensor unit. The data storage device stores a preference data set that includes a plurality of wheel speeds and a plurality of maximum allowances of difference between speeds of the wheels corresponding respectively to the wheel speeds. The control sub-system is further configured to determine one of the maximum allowances corresponding to one of the wheel speeds that matches a smaller one of the current speeds of the wheels, and to control a difference between speeds of the wheels according to an actual allowance of difference between speeds of the wheels that is a product of the adjusting ratio and the one of the maximum allowances thus determined.

BRIEF DESCRIPTION OF THE DRAWINGS

Other features and advantages of the present disclosure will become apparent in the following detailed description of an embodiment with reference to the accompanying drawings, of which:

FIG. 2 presents fragmentary schematic front sectional views of a turning control mechanism of the balancing transporter of the first embodiment, illustrating the turning control mechanism limiting a range of angles that a frame rod can pivot relative to a frame body;

FIG. 21 presents fragmentary side views of the balancing transporter of the tenth embodiment, illustrating a balance compensating module of the balancing transporter keeping the frame body from tilting;

DETAILED DESCRIPTION

Figure 1:
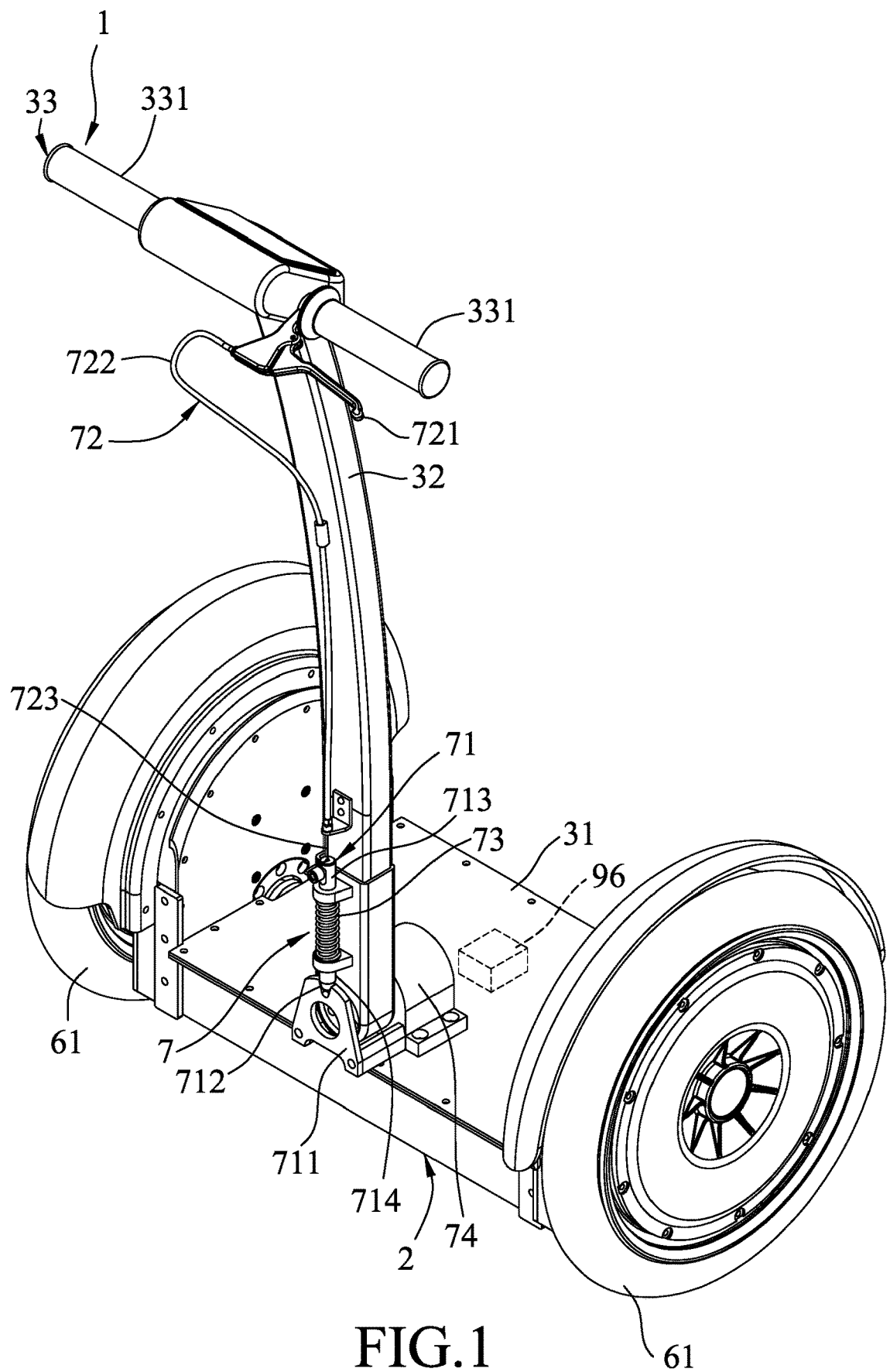
FIG. 1 is a perspective view of a balancing transporter according to a first embodiment of the present disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIGS. 1 and 2, a balancing transporter according to a first embodiment of the present disclosure is shown. The balancing transporter includes a vehicle frame 1, a turning control mechanism 7 and a main control system 96.

The vehicle frame 1 includes a frame unit 2 and a pair of wheels 61 spaced apart from each other. The frame unit 2 includes a frame body 31, a frame rod 32 and a handle bar 33. The frame body 31 is mounted between the wheels 61 and is provided for a user to stand thereon. The frame rod 32 includes a lower portion pivotally connected to the frame body 31. The handle bar 33 is mounted on a top end of the frame rod 32 and has opposite ends that are respectively mounted with two handles 331.

The turning control mechanism 7 is mounted on the vehicle frame 1 and includes a limiting unit 71, a controlling unit 72, a biasing member 73 and a rotational sensor unit 74. The limiting unit 71 is configured to limit the frame rod 32 to pivot relative to the frame body 3 within a range of angles, and includes a limiting block 711 and a movable block 713. The limiting block 711 is mounted on the frame body 31, formed with a limiting notch 712 having a cross-sectional dimension decreasing gradually toward the frame body 31. The movable block 713 is mounted to the frame rod 32 in a movable manner along a longitudinal direction of the frame rod 32 and detachably engages the limiting block 711. The movable block 713 is configured to be brought by the frame rod 32 to swing relative to the limiting block 711. The movable block 713 includes a tapered end portion 714 tapering toward the frame body 31 and engaging the limiting notch 712 in an upwardly detachable manner. The biasing member 73 is mounted between the movable block 713 and the frame rod 32 for biasing the movable block 713 to move toward the limiting block 711 and to engage the limiting notch 712. Note that the limiting block 711 and the movable block 713 may be mounted respectively on the frame rod 32 and the frame body 31 in other embodiments of this disclosure, and the placement of the limiting block 711 and the movable block 713 is not limited to the disclosure herein.

The controlling unit 72 includes an operating lever 721 mounted to one of the handles 331, a positioning tube 722 connected to and generally extending along the frame rod 32, and a pulling cable 723 extending through and movable relative to the positioning tube 722, and having opposite ends connected respectively and fixedly to the operating lever 721 and the movable block 713. When the operating lever 721 is operated to pull the pulling cable 723 upwardly, the movable block 713 is driven to move away from the limiting block 711 so as to disengage the tapered end portion 714 of the movable block 713 from the limiting notch 712 and to adjust a clearance between the tapered end portion 714 and the limiting notch 712 for adjustment of the range of angles the frame rod 32 is allowed to pivot relative to the frame body 31. The greater the clearance, the greater the extent the movable block 713 is able to swing relative to the limiting block 711. Note that when the movable block 713 is pulled upwardly, the biasing member 73 is compressed to store a restoring force.

In this embodiment, the controlling unit 72 is similar to a combination of a brake lever, a cable housing and a brake cable that are utilized in bicycles, in which the brake lever is to be operated by a user. However, control of movement of the movable block 713 relative to the limiting block 711 is not limited to the disclosure herein. The controlling unit 72 can be implemented by various mechanisms that are operable to drive the movable block 713 to move relative to the limiting block 711 and that are to be mounted adjacent to the handle bar 33. For example, in other embodiments, the controlling unit 72 is a linear actuator which is activatable to actuate the movable block 713 to switch between an engaging state where the movable block 713 engages the limiting block 711 and a disengaging state where the movable block 713 disengages from the limiting block 711. The linear actuator may be implemented as a linear electromagnetic actuator or a linear motor cooperating with a switch to be operated by a user and to drive the movable block 713 to move relative to the limiting block 711.

In this embodiment, the rotational sensor unit 74 is a potentiometer/voltmeter, is mounted to the frame body 31, is coaxially coupled with the frame rod 32, and is configured to sense an angle by which the frame rod 32 pivots relative to the frame body 31 and to output a pivot angle signal indicating the angle thus sensed. Note that the rotational sensor unit 74 may sense the angle by which the frame rod 32 pivots relative to the frame body 31 in various manners, and implementation of the rotational sensor unit 74 is not limited to the disclosure herein.

The main control system 96 receives signals transmitted by a gyroscope (not shown) and an accelerometer (not shown) to control the balancing transporter to travel straight. Additionally, the main control system 96 is communicatively connected to the rotational sensor unit 74 for receiving the pivot angle signal, and is configured to control a difference between speeds of the wheels 61 according to the pivot angle signal so as to control a steering direction of the balancing transporter. Specifically, the turning degree of the balancing transporter increases as the angle thus sensed and indicated by the pivot angle signal increases.

When the user intends to steer the balancing transporter to turn, for example, to turn left, the user operates the controlling unit 72 to drive the movable block 713 to move upwardly relative to the frame rod 32 so that the clearance between the tapered end portion 714 and the limiting notch 712 is increased and that the range of angles the frame rod 32 is allowed to pivot relative to the frame body 31 is increased. In this way, the user can steer the balancing transporter to turn left, and the range of the angles that the frame rod 32 can pivot relative to the frame body 31 is limited by the clearance between the tapered end portion 714 and the limiting notch 712. Note that as shown in the right part of FIG. 2, once the movable block 713 is completely detached from and disengages the limiting notch 712 as controlled by the user, the frame rod 32 is allowed to freely pivot relative to the frame body 31. That is to say, the range of angles that the frame rod 32 is allowed to pivot relative to the frame body 31 is controlled according to the user's intention.

As a result, the action of operating the controlling unit 72 makes the user aware of the situation that the balancing transporter is in a turnable traveling mode and that he/she needs to carefully steer the balancing transporter to avoid of a dangerous abrupt turn.

Note that when the controlling unit 72 is not operated and the frame rod 32 is locked without swiveling, in a case that the user steering the balancing transporter losses balance and then exerts a force on the frame rod 32 to regain his/her balance, the frame rod 32 would not be driven to pivot relative to the frame body 31 by the force thereby preventing undesired sudden turning of the balancing transporter.

Figure 3:
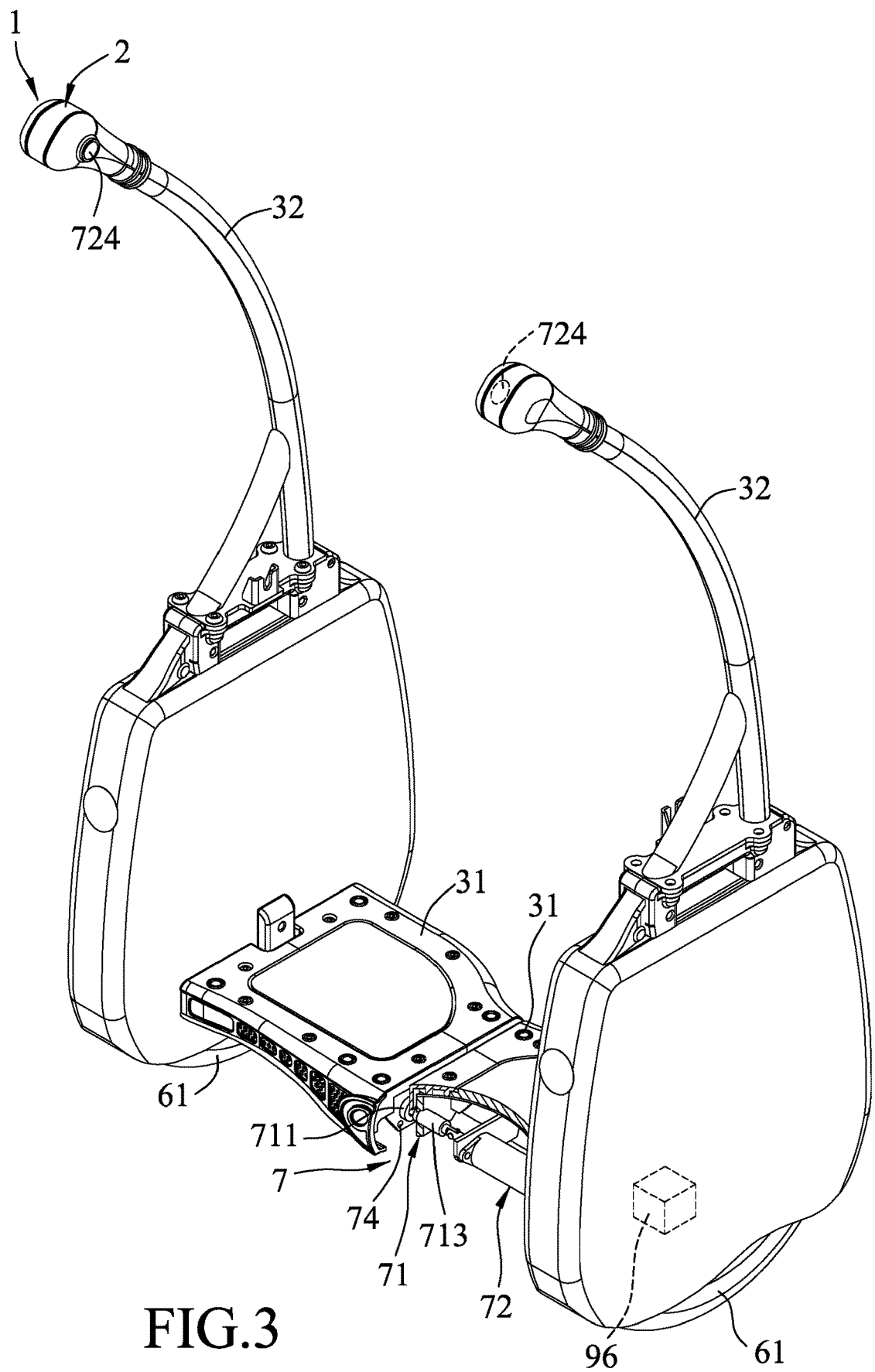
FIG. 3 is a cutaway view of the balancing transporter according to a second embodiment of the present disclosure.
Figure 4:
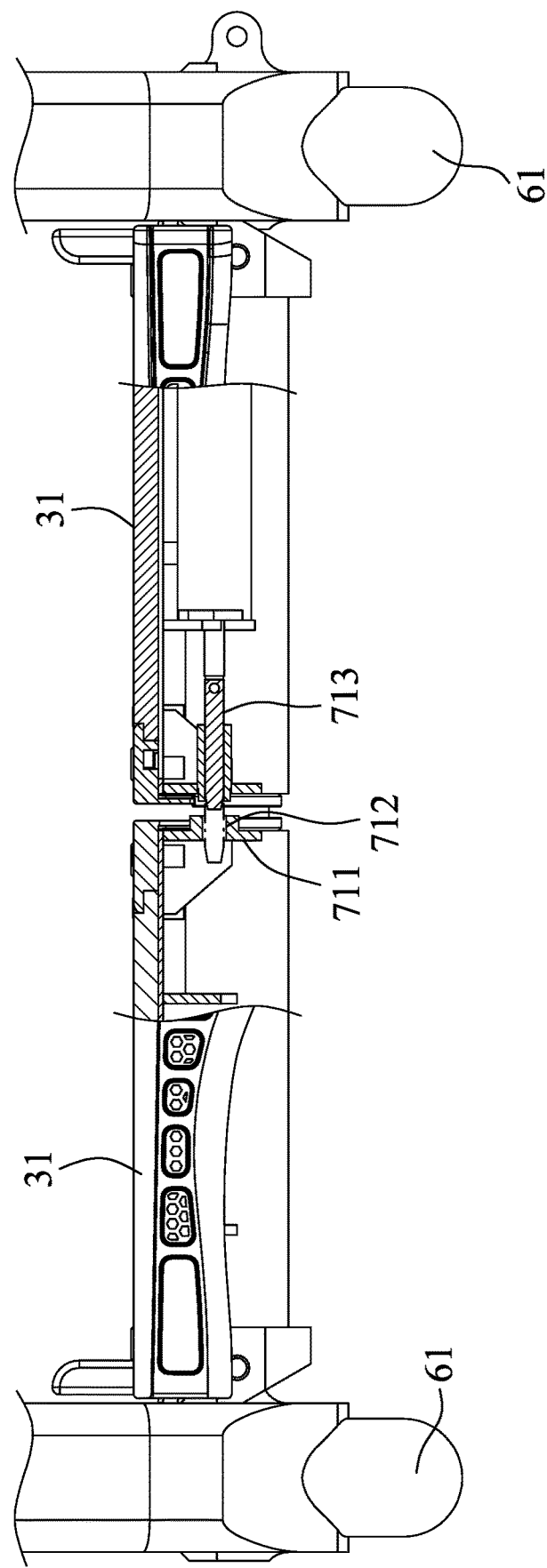
FIG. 4 is a fragmentary schematic sectional view of the balancing transporter of the second embodiment, illustrating a movable block of a turning control mechanism detachably engaging a limiting block.

Referring to FIGS. 3 and 4, the balancing transporter according to a second embodiment of the present disclosure is shown. The second embodiment is similar to the first embodiment, and the difference therebetween resides in the design of the vehicle frame 1 and the turning control mechanism 7. Specifically, in the second embodiment, the frame unit 2 of the vehicle frame 1 includes two frame bodies 31 that are pivotally connected to each other and that are mounted rotatably and respectively to the wheels 61. The frame unit 2 further includes two frame rods 32 spaced apart from each other and respectively coupled to the frame bodies 31. The wheels 61 are also respectively mounted on the frame rods 32.

The turning control mechanism 7 includes a limiting unit 71 mounted to the frame bodies 31, a controlling unit 72 mounted to the frame unit 2, and a rotational sensor unit 74 for sensing an angle by which the frame bodies 31 pivot relative to each other and outputting a rotation angle signal indicating the angle thus sensed. Since the techniques for sensing relative rotations between two objects are well known, and can be implemented by, for example, a Hall effect sensor, the details of the same are omitted for the sake of brevity.

The limiting unit 71 includes a limiting block 711 and a movable block 713 that are mounted respectively on the frame bodies 31. The limiting block 711 is formed with a limiting notch 712, and the movable block 713 detachably engages the limiting notch 712 of the limiting block 711.

The controlling unit 72 is operable to drive the movable block 713 to move relative to the limiting block 711 so that the frame bodies 31 are allowed to pivot relative to each other when the movable block 713 disengages from the limiting block 711 and that the frame bodies 31 are prevented from pivoting relative to each other when the movable block 713 engages the limiting block 711. In this embodiment, the controlling unit 72 is a linear actuator and further includes two switches 724 mounted respectively to top ends of the frame rods 32. When one of the switches 724 is operated, the controlling unit 72 is triggered to drive the movable block 713 that engages the limiting block 711 to disengage from the limiting block 711 so as to move from an attached state where the frame bodies 31 are prevented from pivoting relative to each other to a detached state where the frame bodies 31 are allowed to pivot relative to each other. When the operated one of the switches 724 is released from operation, the controlling unit 72 drives the movable block 713 to move to the attached state and the frame bodies 31 are prohibited from pivoting relative to each other. The main control system 96 is communicatively connected to the rotational sensor unit 74 for receiving the rotation angle signal. The main control system 96 is configured to control a difference between speeds of the wheels 61 according to the rotation angle signal so as to control a steering direction of the balancing transporter.

It should be noted that the mechanism for preventing relative rotation of the frame bodies 31 is not limited to the structure implemented by the limiting block 711 and the movable block 713 as described above and can be implemented by, for example, electromagnets to drive the movable block 713 to move between the attached state and the detached state.

By virtue of the controlling unit 72, relative rotation of the frame bodies 31 is prevented when neither one of the switches 724 is operated. Additionally, the frame rods 32 can be kept upright and are provided for user to hold for remaining balance. Similar to the first embodiment, it is required to operate one of the switches 724 in order to steer the balancing transporter to turn and thus the user would be aware of the situation that the balancing transporter is in the turnable traveling mode and would carefully steer the balancing transporter.

Figure 5:
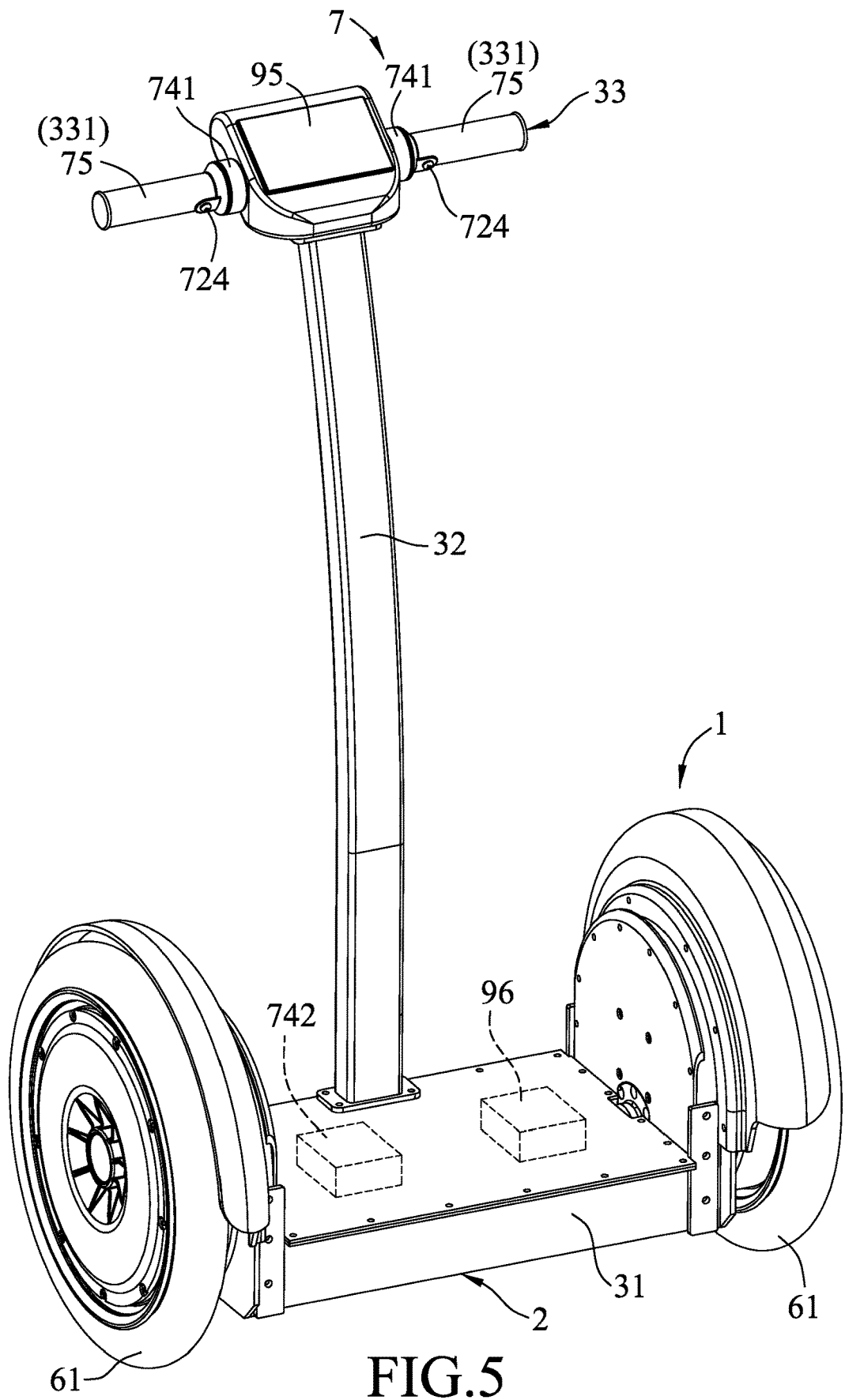
FIG. 5 is a perspective view illustrating the balancing transporter according to a third embodiment of the present disclosure.
Figure 6:
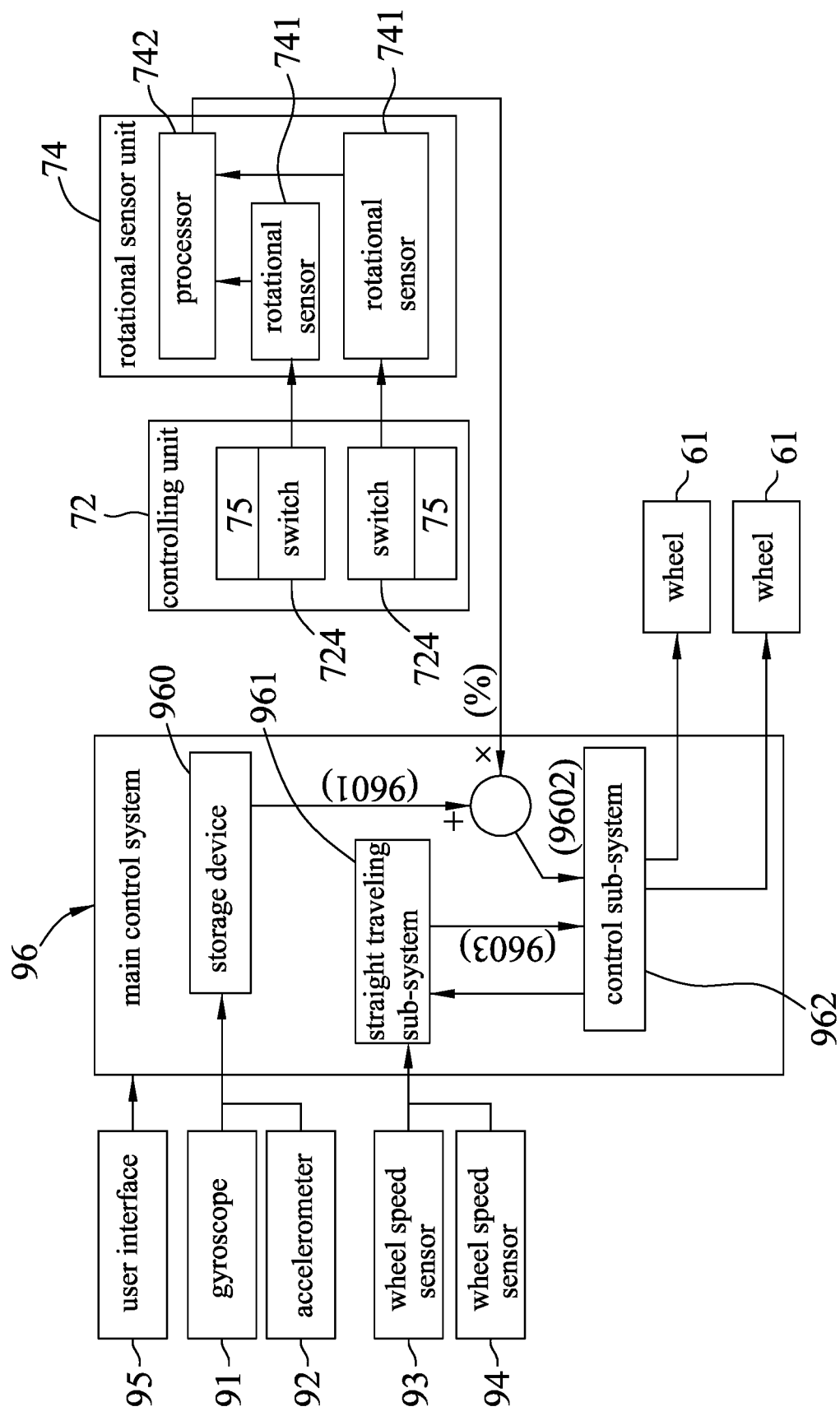
FIG. 6 is a schematic block diagram of the third embodiment.

Referring to FIGS. 5 and 6, the balancing transporter according to a third embodiment of the present disclosure is shown. The third embodiment is similar to the first embodiment, and the difference therebetween resides in the design of the vehicle frame 1, the turning control mechanism 7 and the main control system 96.

In the third embodiment, the frame rod 32 of the vehicle frame 1 is fixed on and is not pivotable relative to the frame body 31. The turning control mechanism includes two adjusting members 75 rotatably and respectively sleeved on the handles 331. The controlling unit 72 includes two switches 724 mounted respectively to the handles 331. The rotational sensor unit 74 is mounted on the frame unit 2 and includes two rotational sensors 741 and a processor 742. The rotational sensors 741 are mounted respectively on the handles 331 for respectively sensing rotation angles of the adjusting members 75 respectively relative to the handles 331, and each output a rotation angle signal indicating the respective one of the rotation angles. The switches 724 are respectively and communicatively connected to the rotational sensors 741. In this embodiment, the rotational sensors 741 are Hall effect sensors for sensing rotation angles of the adjusting members 75 respectively relative to the handles 331. In other embodiments, the rotational sensor unit 74 may be implemented using optical sensors or rotary encoders, and implementation of the rotational sensor unit 74 is not limited to the disclosure herein.

In this embodiment, each of the switches 724 can be operated to switch between "ON" and "OFF" states. Each of the rotational sensors 741 senses, in response to being triggered by the respective one of the switches 724 that is operated to the "ON" state, the rotation of the respective one of the adjusting members 75 relative to the respective one of the handles 331, and outputs a rotation angle signal indicating the rotation angle of the respective adjusting members 75.

The processor 742 is communicatively connected to the rotational sensors 741 for receiving the rotation angle signals and only takes one rotation angle signal coming from one of the rotation sensors 741 that is triggered to "ON" state the first amongst the rotation sensors 741 as a useful signal for processing. That is to say, the processor 742 determines, based on the rotation angle signal received from one of the rotational sensors 741 triggered by one of the switches 724 that is the first (earlier) of the two to have been operated to switch to the "ON" state, the rotation angle of one of the adjusting members 75 corresponding to the one of the rotational sensors 741. In this way, the user is only able to select one of the switches 724 for operation, and only the corresponding one of the adjusting members 75 may be operated for steering control. Accordingly, a situation that the two adjusting members 75 are operated simultaneously to result in contradicting rotation angle signals may be prevented.

It should be noted that, the processor 742 is designed to finish a turning-control-cycle only after one of the adjusting members 75 corresponding to the one of the switches 724 that was operated the first by the user has returned to its original position (i.e., the balancing transporter is traveling straight again). Then, the processor 742 is able to make another determination on the rotation angle (of one of the adjusting members 75 corresponding to one of the switches 724 that is later operated to switch to the "ON" state, which may be the same or a different switch 724 as the previously mentioned "the one of the switches 724"). Moreover, in case the user accidentally operates both of the adjusting members 75 at the same time or operates one of the adjusting members 75 after the other one of the adjusting members 75 is operated, the processor 742 is designed to wait after both of the adjusting members 75 have returned to their respective original positions to resume the process of determining the rotation angle of one of the adjusting members 75 corresponding to an operated switch 724.

With respect to the rotation angle signals received from the rotational sensors 741, the processor 742 also determines an adjusting ratio by analyzing the rotation angle indicated by the rotation angle signals and then outputs a signal indicative of the adjusting ratio ranging from 0% to 100% to the main control system 96 shown in FIG. 6. The main control system 96 includes a straight traveling sub-system 961, a wheel control sub-system 962 and a data storage device 960.

The straight traveling sub-system 961 detects a leaning tendency of the frame body 31 and outputs a driving command 9603 to control the balancing transporter to travel forwardly or backwardly.

The data storage device 960 stores a plurality of data sets each of which includes a plurality of wheel speeds and a plurality of maximum allowances of speed difference 9601. The maximum allowances correspond respectively to the wheel speeds. Note that each maximum allowance represents a maximum allowable difference between the speeds of the wheels 61. In this embodiment, the balancing transporter further includes a user interface 95 operable to select one of the data sets stored in the data storage device 960. In other embodiments, one or more data sets preferred by the user may be set manually. For safety concerns, before riding, the user of the balancing transporter may select one of the preferred data sets according to his/her real practical performance or skill level. The control sub-system. 962 is communicatively connected to the storage device 960 and the straight traveling sub-system 961. In this embodiment, the straight traveling sub-system 961 is communicatively connected to two wheel speed sensors 93, 94, and provides a smaller one of the current speeds of the wheels 61 to the control sub-system 962.

The main control system 96 is also configured to determine one of the maximum allowances in the preferred data set, which is selected by the user and set as a working set, in order for the sub-system 961 to obtain a real time allowable-wheel-speed-difference value 9601. In a real working cycle, this real time value 9601 has to be multiplied by the output % value of the processor 742 to get a real wheel speed difference allowable value 9602, and then, the value 9602 will instantly be input to the control sub-system 962 to yield real time commands to drive the wheels 61 to move accordingly. For example, the control sub-system 962 controls one of the wheels 61 to travel at a speed that is its current speed plus the actual allowance 9602 and controls the other one of the wheels 61 to travel at its current speed. In this way, the control sub-system 962 controls the wheels 61 to travel with a speed difference according to the actual allowance so the balancing transporter is able to turn accordingly.

Figure 7:
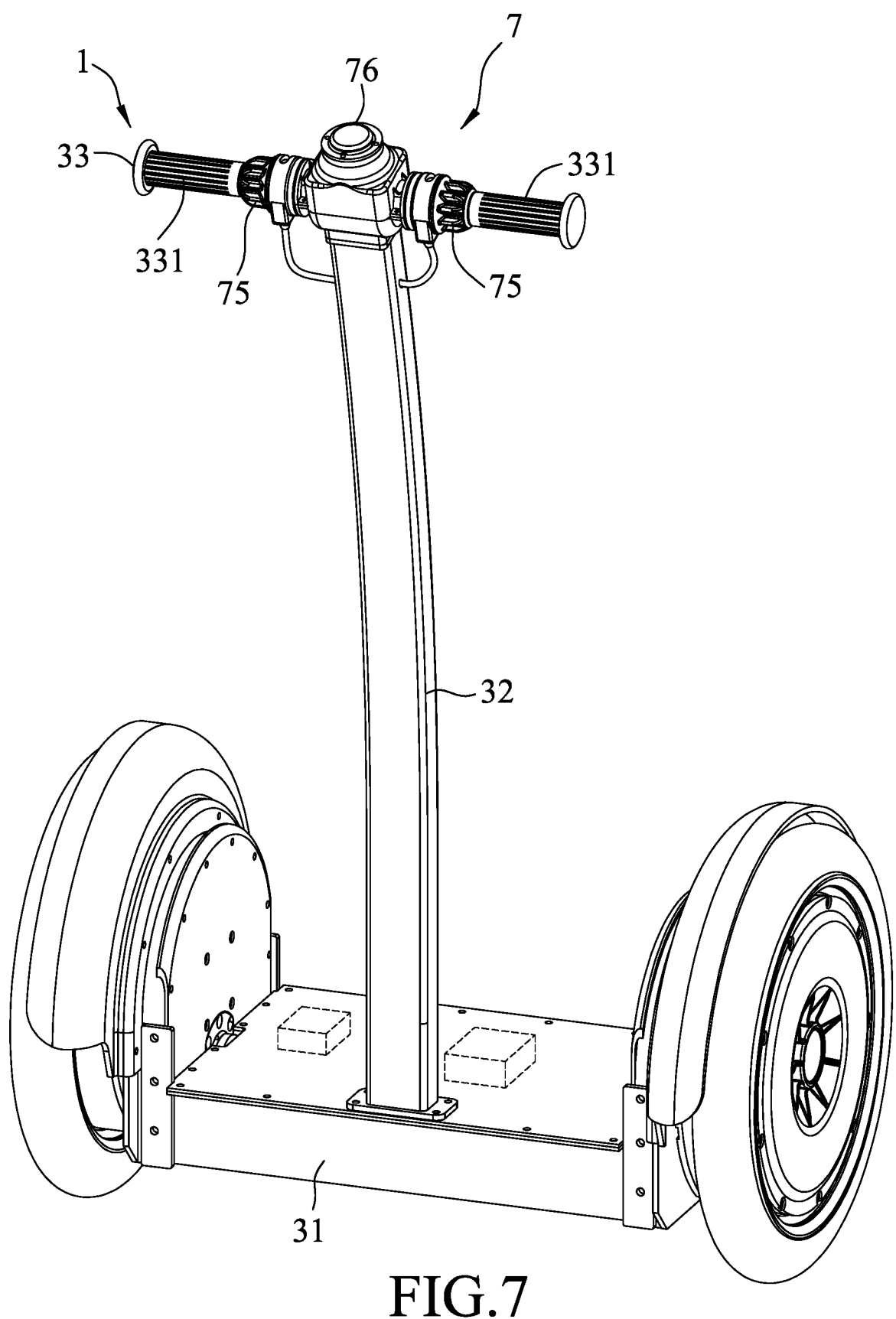
FIG. 7 is a perspective view illustrating the balancing transporter according to a fourth embodiment of the present disclosure.
Figure 8:
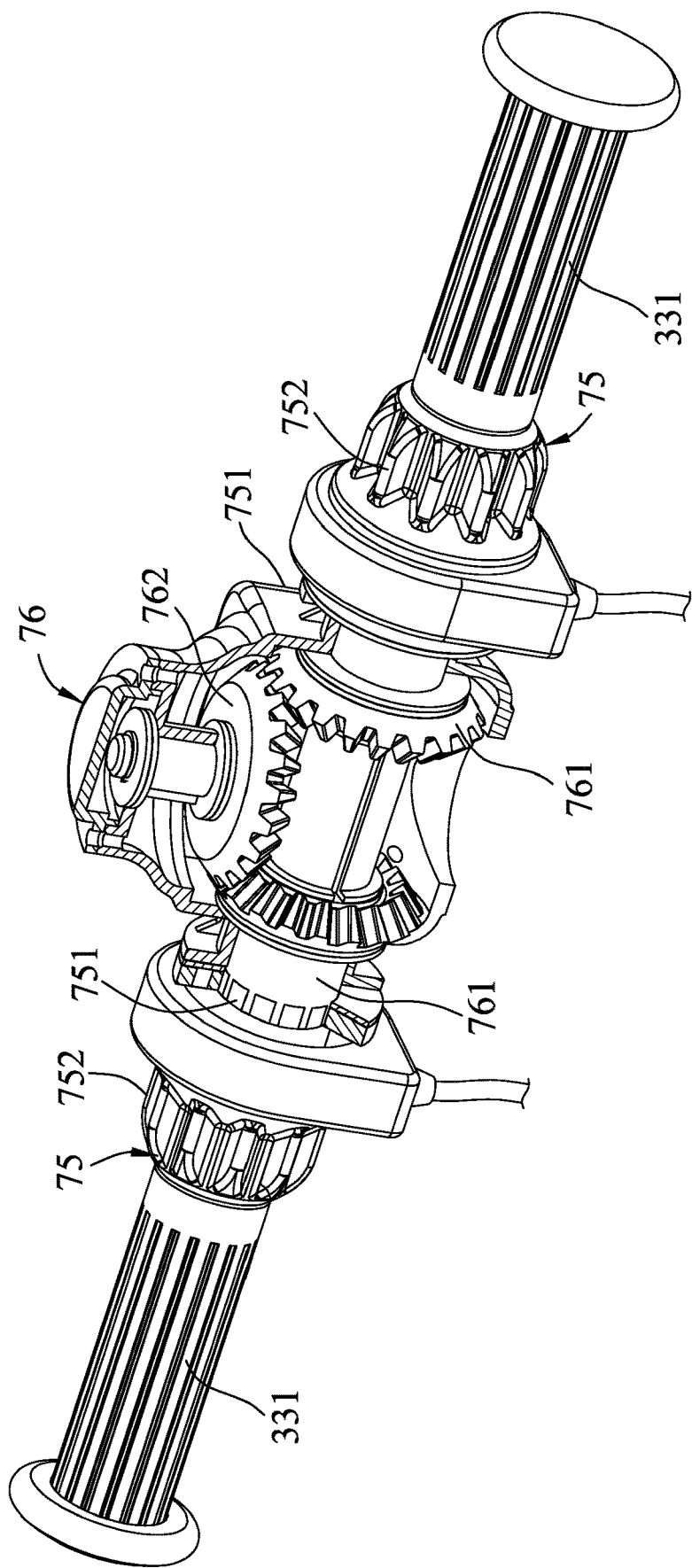
FIG. 8 is a fragmentary cutaway view of a turning control mechanism of the balancing transporter of the fourth embodiment.
Figure 9:
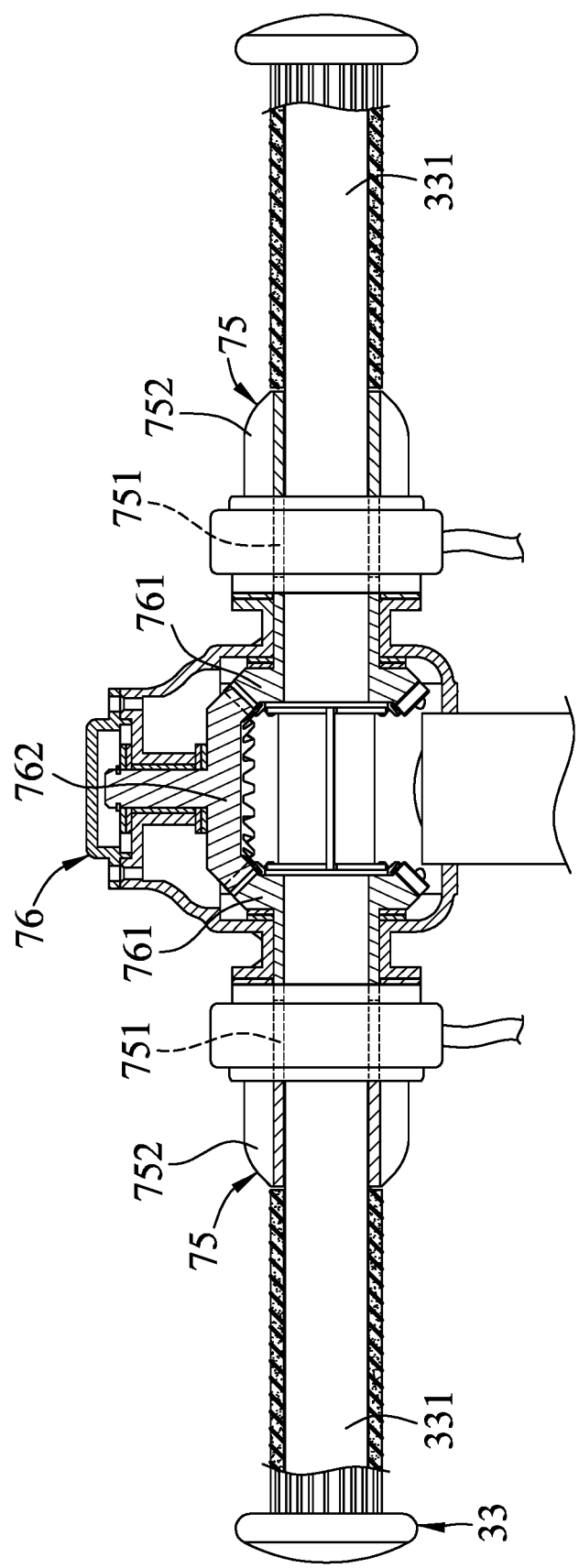
FIG. 9 is a schematic sectional view corresponding to FIG. 8.

Referring to FIGS. 7-9, the balancing transporter according to a fourth embodiment of the present disclosure is shown. The forth embodiment is similar to the third embodiment and the difference therebetween resides in the structure of the turning control mechanism 7.

In the fourth embodiment, the turning control mechanism 7 further includes a rotational interlock unit 76 mounted on the handle bar 33, interconnecting the adjusting members 75, and configured to drive one of the adjusting members 75 to rotate in a direction opposite to that of the other one of the adjusting members 75.

Each of the adjusting members 75 includes a sleeved portion 751 sleeved on a portion of the respective one of the handles 331, and an accessible portion 752 radially protruding from an outer surface of the sleeved portion 751 and to be operated by the user of the balancing transporter to rotate.

The rotational interlock unit 76 includes two first gears 761 and a second gear 762. The first gears 761 are sleeved respectively on the handles 331, and are connected respectively and co-rotatably to the adjusting members 75. The second gear 762 meshes with the first gears 761 to drive one of the first gears 761 to rotate in a direction opposite to that of the other one of the first gears 761. Note that each of the first gears 761 is driven to rotate by rotation of the accessible portion 752 of the respective one of the adjusting members 75. When one of the first gears 761 is driven to rotate, the second gear 762 drives the other one of the first gears 761 to rotate in a direction opposite to that of the one of the first gears 761. In this way, the adjusting members 75 connected respectively and co-rotatably to the first gears 761 are interlocked. In this embodiment, the first and second gears 761, 762 are bevel gears, but implementation of the same is not limited to the disclosure herein.

With the design of the vehicle frame 1 and the turning control mechanism 7, the action of fingers of the user dialing the adjusting member 75 would not interfere with the action of hands of the user grabbing the handles 331, and the frame rod 32 which does not pivot relative to the frame body 31 may be used to keep balance of the user on the balancing transporter. In this way, the risk involving a sudden, unintended turn caused by accidentally dragging the handles 331 in an emergency situation may be reduced, so as to promote safety in using the balancing transporter.

In addition, since the adjusting members 75 are interconnected by the rotational interlock unit 76 and are restricted to rotate in opposite directions, contradicting rotation angle signals caused by rotation of the adjusting members 75 in the same direction may not be generated.

Figure 10:
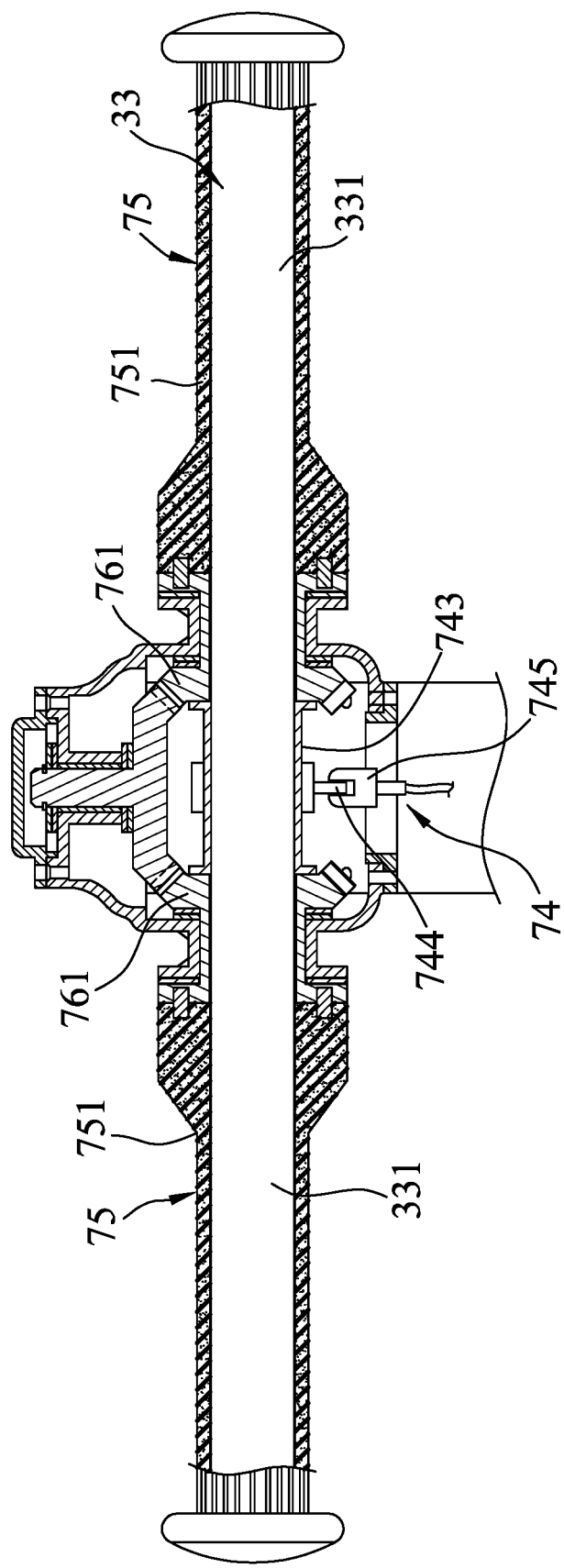
FIG. 10 is a schematic sectional view similar to FIG. 9 but illustrating a turning control mechanism of the balancing transporter according to a fifth embodiment of the present disclosure.

Referring to FIG. 10, the balancing transporter according to a fifth embodiment of the present disclosure is shown. The fifth embodiment is similar to the fourth embodiment and the difference therebetween resides in the structure of the turning control mechanism 7.

In the fifth embodiment, the accessible portions 752 (see FIG. 8) of the adjusting members 75 are omitted and the sleeved portions 751 are configured to be tubular and sleeved on the handles 331 and are provided for the user to grip onto and to steer the balancing transporter. The first gears 761 of the rotational interlock unit 76 are sleeved respectively on the handles 331, and are connected respectively and co-rotatably to the adjusting members 75.

In this embodiment, the rotational sensor unit 74 is a rotary encoder and includes an encoded device 743 and a sensor 745. The encoded device 743 is sleeved on the handle bar 33, is disposed between the first gears 761, and is to be driven by and to rotate together with one of the adjusting members 75. In this embodiment, the encoded device 743 is connected co-rotatably to a corresponding one of the first gears 761, and is rotatable therewith when the one of the adjusting members 75 is operated to rotate.

The encoded device 743 includes an encoded plate 744 extending radially and outwardly of the handle bar 33 and formed with a plurality of encoded structures (not shown) on a periphery of the encoded plate 744. The encoded structures respectively represent a plurality of codes each indicative of a position of the encoded device 743, and are for example, but not limited to, different arrangement of physical contacts, different optical patterns, or openings with different sizes. The sensor 745 is mounted on the handle bar 33, is configured to sense the code(s) on the encoded plate 744, and is communicatively connected to the processor 742 to transmit the code(s) thereto. Then, the processor 742 determines the rotation angle of the one of the adjusting members 75 based on the code (s) sensed by the sensor 745.

Note that since the implementation of the rotational sensor unit 74 is well known, further details of the encoded device 743 and the sensor 745 are omitted for the sake of brevity.

Figure 11:
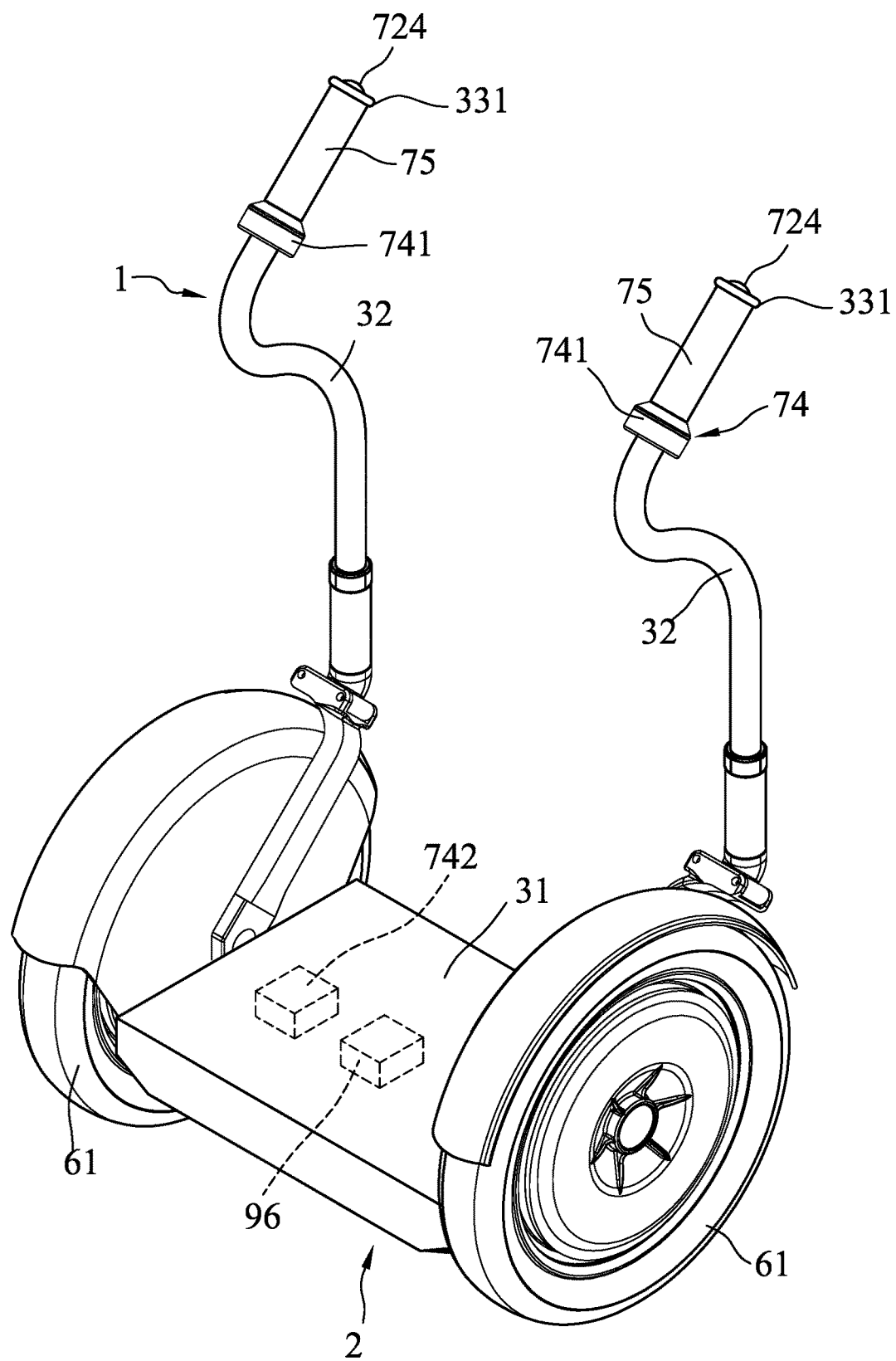
FIG. 11 is a perspective view of the balancing transporter according to a sixth embodiment of the present disclosure.

Referring to FIG. 11, the balancing transporter according to a sixth embodiment of the present disclosure is shown. The sixth embodiment is similar to the third embodiment and the difference therebetween resides in the structure of the vehicle frame 1.

In the sixth embodiment, the frame unit 2 of the vehicle frame 1 includes a frame body 31, and two frame rods 32 spaced apart from each other and mounted on opposite sides of the frame body 31. The frame rods 32 are provided respectively with two handles 331, and are connected rotatably and respectively to the wheels 61. The frame rods 32 are mounted with the adjusting members 75, the rotational sensors 741 and the switches 724. Since how the rotational sensors 741 are triggered by the respective switches 724 to sense the rotations of the adjusting members 75 is the same as that described in the third embodiment, the details of the same are not repeated for the sake of brevity.

Figure 12:
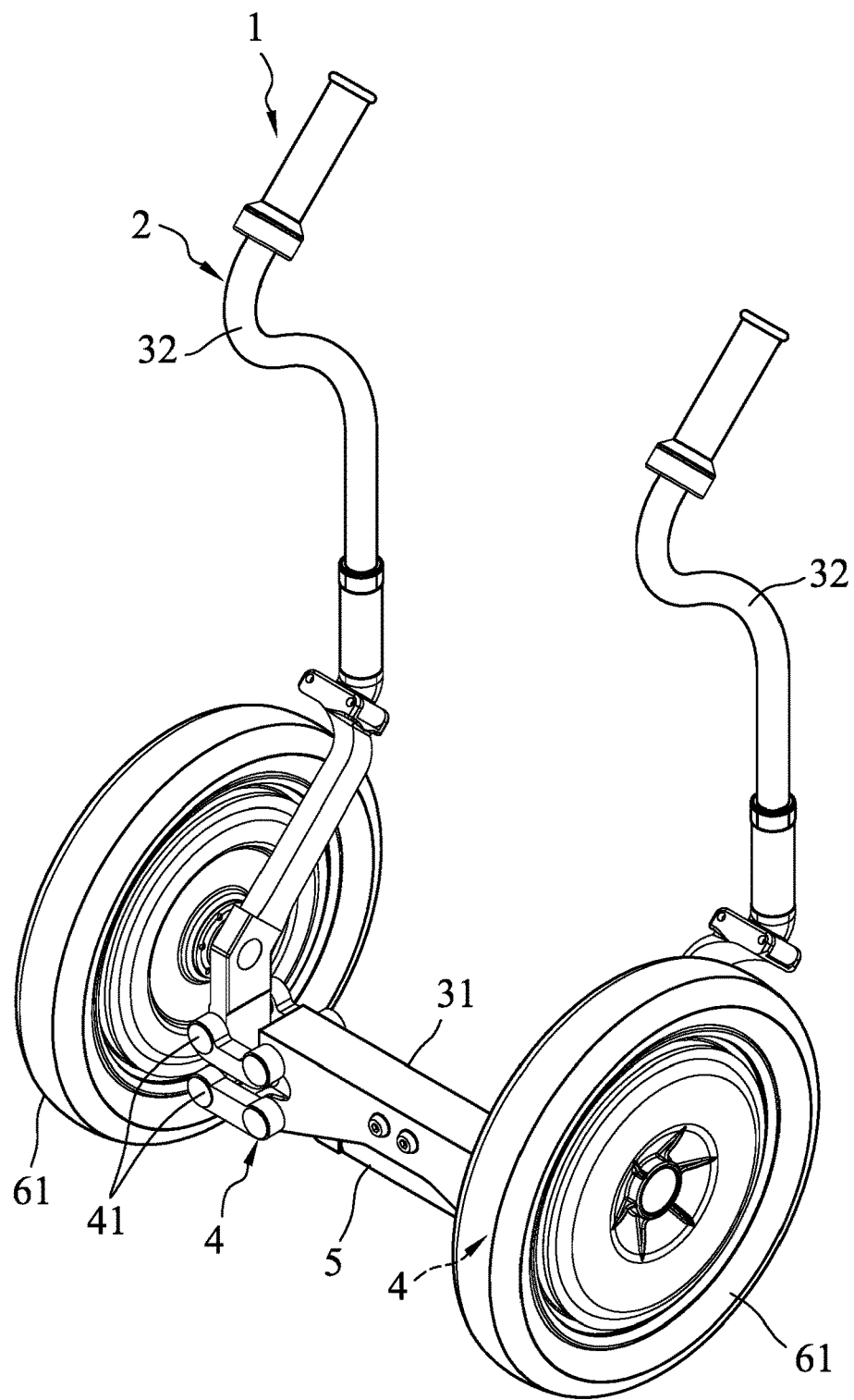
FIG. 12 is a perspective view of the balancing transporter according to a seventh embodiment of the present disclosure.
Figure 13:
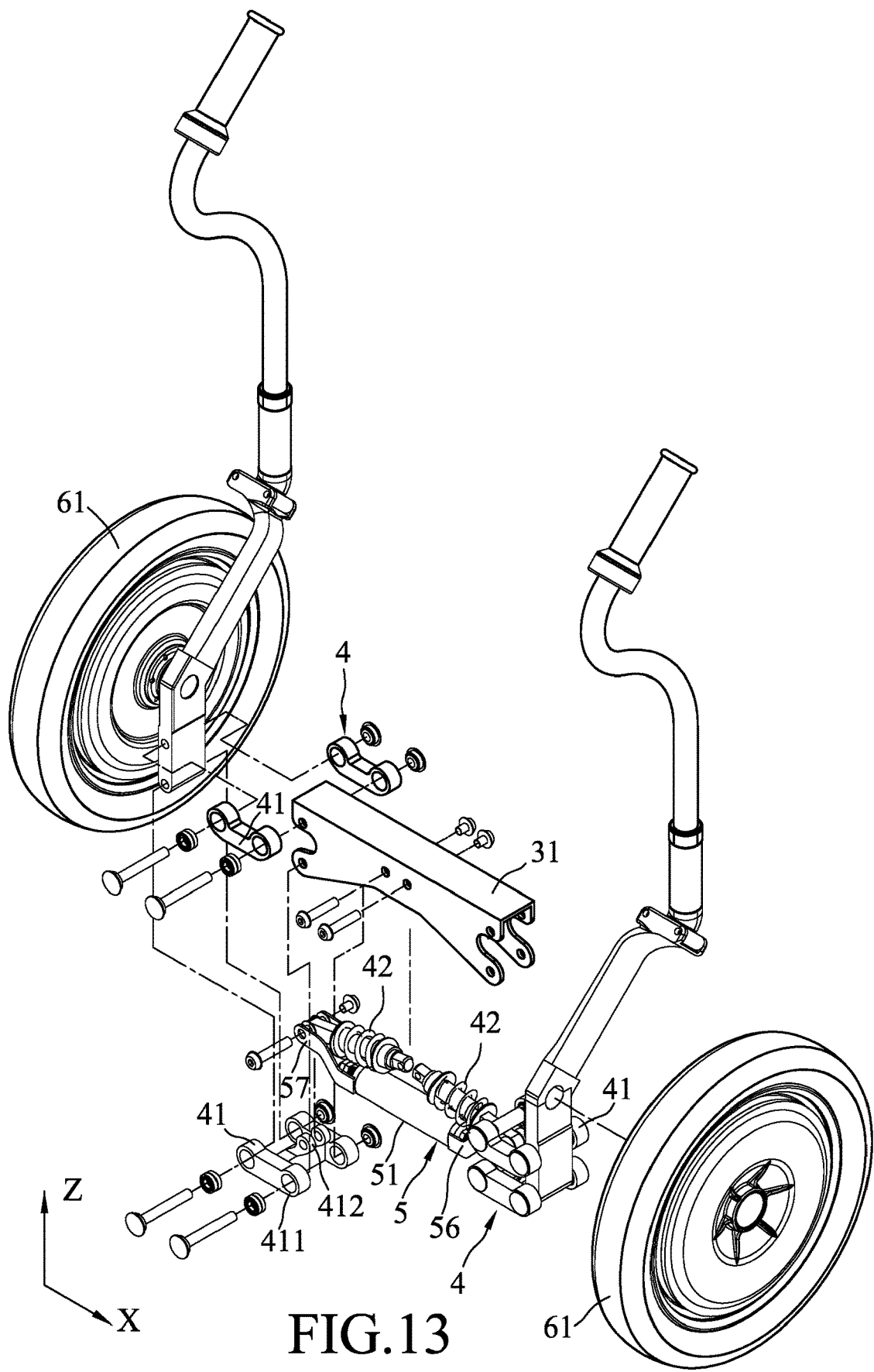
FIG. 13 is a partly exploded perspective view of the balancing transporter of the seventh embodiment.
Figure 14:
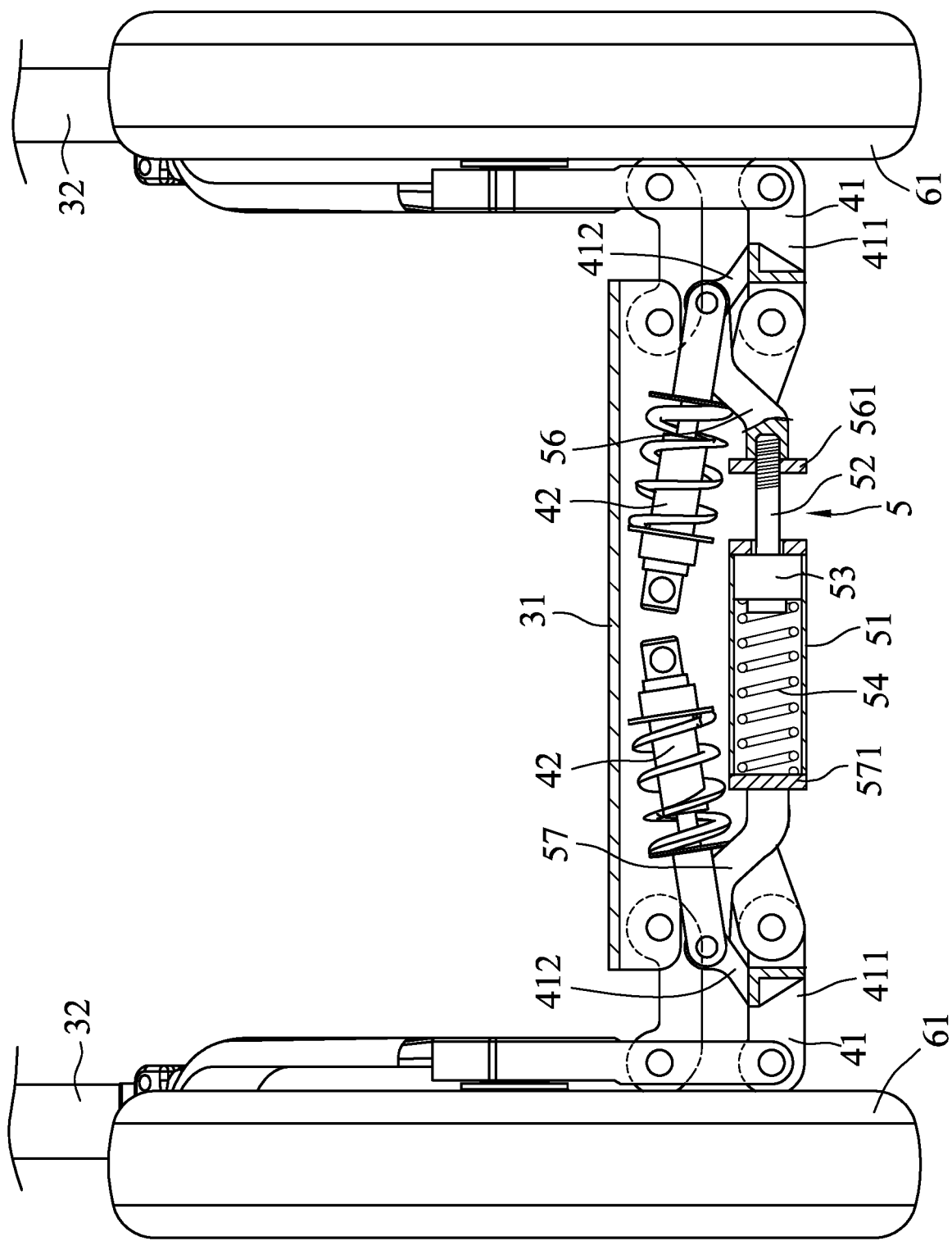
FIG. 14 is a schematic partly sectional view of the balancing transporter of the seventh embodiment.

Referring to FIGS. 12-14, the balancing transporter according to a seventh embodiment of the present disclosure is shown. The seventh embodiment is similar to the sixth embodiment and the difference therebetween resides in the structure of the vehicle frame 1.

In the seventh embodiment, the frame unit 2 of the vehicle frame 1 includes a frame body 31 mounted between the frame rods 32, two shock absorbing modules 4 (only one is visible in FIG. 12) and a balance compensating module 5. The shock absorbing modules 4 are mounted respectively and symmetrically to the frame rods 32 and are connected to the frame body 31. Each of the shock absorbing modules 4 includes a pair of articulated rods 41 and a shock absorber 42. Since the structures of the two shock absorbing modules 4 are the same, only one of the shock absorbing modules 4 will be described in the following description, with respect to the respective one of the two frame rods 32.

The articulated rods 41 of the shock absorbing module 4 extend substantially in a first direction (X), in which the wheels 61 are spaced apart from each other, and are spaced apart from each other substantially in a second direction (Z) transverse to the first direction (X). Each of the articulated rods 41 has opposite ends respectively and pivotally connected to the frame body 31 and a bottom end of the respective frame rod 32 so as to form a four-bar linkage structure.

One of the articulated rods 41 disposed below the other one of the articulated rods 41 in the second direction (Z) includes an articulated segment 411 and a coupling segment 412. The articulated segment 411 is pivotally connected to the frame body 31 and the respective frame rod 32. The coupling segment 412 extends from the articulated segment 411 toward the frame body 31.

The shock absorber 42 extends from the coupling segment 412, and has two ends that are opposite to each other substantially in the first direction (X) and that are pivotally and respectively connected to the frame body 31 and the coupling segment 412 so as to be compressed and extended by relative movements between the frame body 31 and the articulated rods 41. In this embodiment, the shock absorber 42 is a commercially available shock absorber that can be utilized in motorcycles but the present disclosure is not limited in this respect.

The articulated rods 41 and the shock absorber 42 can be driven by relative movements between the frame body 31 and the respective frame rod 32 to pivot and move upwardly and downwardly.

As shown in FIG. 14, the balance compensating module 5 has two ends pivotally and respectively connected to the coupling segments 412 of the shock absorbing modules 4. The balance compensating module 5 is configured to be compressed by the articulated rods 41 where the balance compensating module 5 is connected and not to be extended by the articulated rods 41.

Specifically, the balance compensating module 5 includes a hollow cylinder 51, a shaft rod 52, a positioning member 53 that is threaded on the shaft rod 52, a spring 54, and first and second lugs 56, 57. The first and second lugs 56, 57 respectively include first and second lug flanges 561, 571. The hollow cylinder 51 is threaded to the second lug flange 571 of the second lug 57 at one end of the hollow cylinder 51, is connected to the first lug flange 561 of the first lug 56 through the shaft rod 52 at the other end of the hollow cylinder 51, and is disposed below the shock absorbers 42 in the second direction (Z).

The spring 54 is disposed in the hollow cylinder 51 between the positioning member 53 and the second lug flange 571, and biases the positioning member 53 toward its extended extreme, where the positioning member 53 is adjacent to the first lug flange 561 of the first lug 56. In this embodiment, the spring 54 is a compression spring and is properly pre-loaded to store force for biasing the positioning member 53. The first lug 56 is connected fixedly to the shaft rod 52 at the first lug flange 561, as shown in FIG. 14, and is connected pivotally to the coupling segment 412 of an adjacent (the right) one of the shock absorbing modules 4. The second lug 57 is connected fixedly to one end of the hollow cylinder 51 as shown in FIG. 14, and is pivotally connected to the coupling segment 412 of the other (left) one of the shock absorbing modules 4. Note that the first and second lugs 56, 57 are pivotally and respectively connected to the coupling segments 412 at pivot joints to which the shock absorbers 42 are pivotally and respectively connected.

Figure 24:
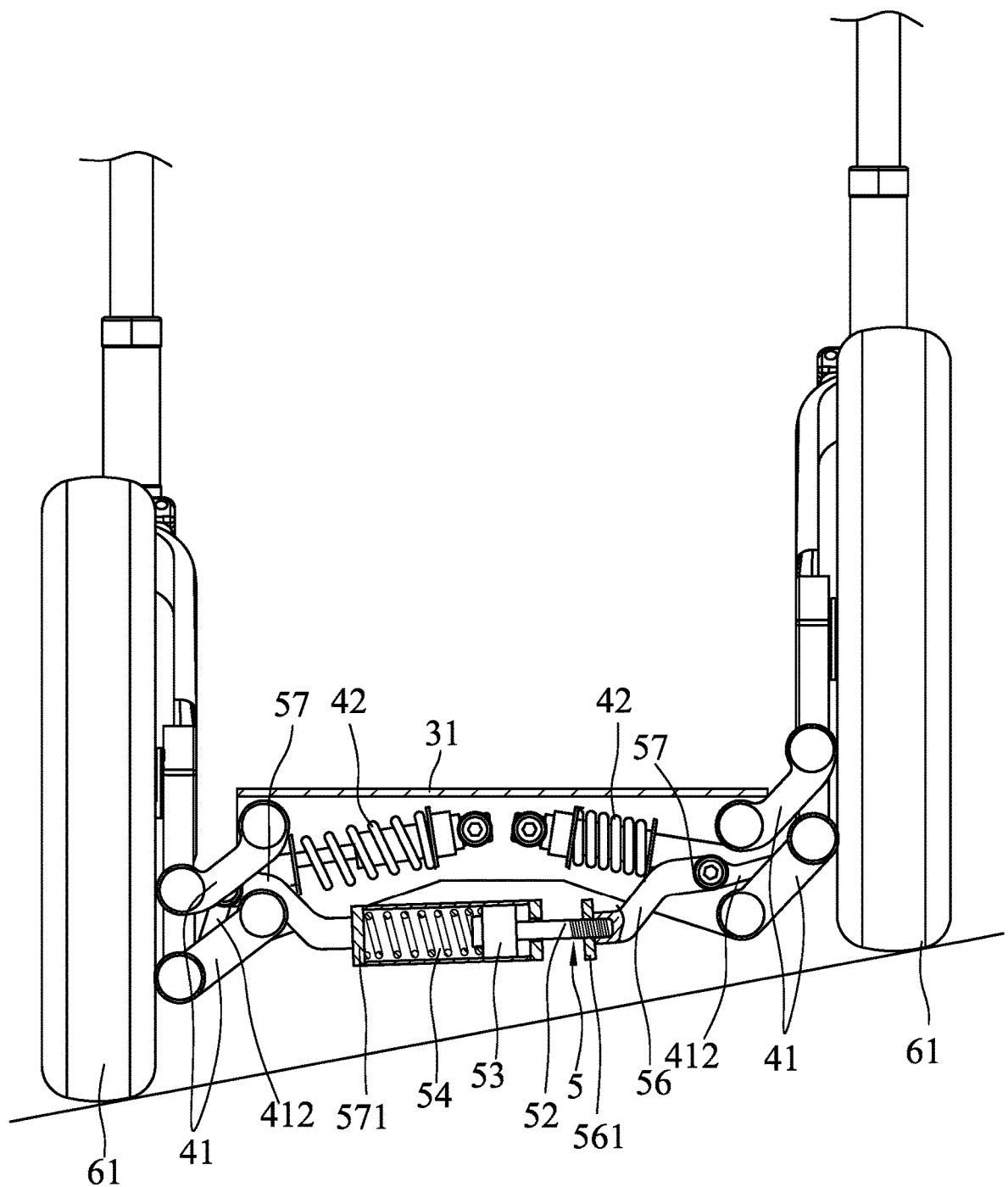
FIG. 24 is a schematic, partly sectional view of the balancing transporter of the seventh embodiment.

The balance compensating module 5 is configured to interactively drive the shock absorbing modules 4 in a manner that when one of the shock absorbing modules 4 moves upwardly, the other one of the shock absorbing modules 4 moves downwardly by an equal amount so as to keep the frame body 31 balanced, i.e., to keep the frame body 31 from tilting. In this embodiment, each of the shock absorbing modules 4 is configured as a four-bar linkage structure. For example, as shown in FIG. 24, when the right wheel 61 runs over a bump and is raised, the right one of the articulated rods 41 swivels upwardly relative to the frame body 31, and drives the first lug flange 561 to push the second lug 57 and the left coupling segment 412 to move. Consequently, the left one of the articulated rods 41 is driven to swivel downwardly by an amount that is equal to a distance that the right articulated rod 41 moves upwardly.

Figure 15:
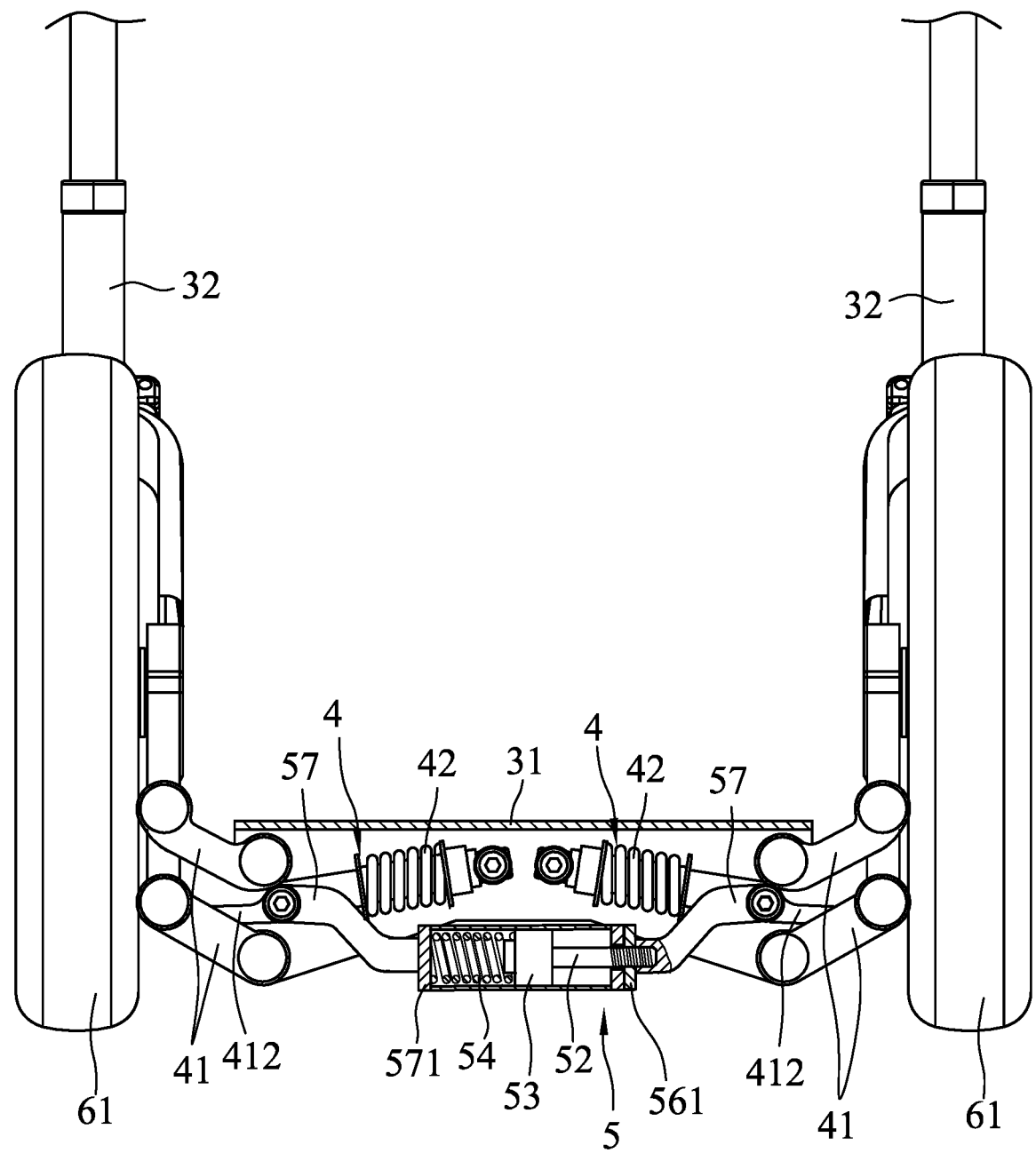
FIG. 15 is similar to FIG. 14 but illustrating that a right wheel of the balancing transporter descends.

As shown in FIG. 15, in another case that both of the wheels 61 are raised simultaneously due to rolling over a bumpy road, both of the articulated rods 41 will swivel upward and push the two shock absorbers 42 concurrently and respectively, then the coupling segments 412 are forced to swivel inwardly toward each other at the same time, and then the spring 54 is compressed. As a result, the above-mentioned raised forces exerted on the wheels 61 can be absorbed by the shock absorbers 42 as well as the balance compensating module 5.

By virtue of the cooperation among the shock absorbing modules 4 and the balance compensating module 5, the frame body 31 may be kept from tilting, and the frame rods 32 may be kept upright during traveling of the balancing transporter. In this way, when steering the balancing transporter on a bumpy road, it is relatively simple for the user to stand on the frame body 31 and to hold the frame rods 32 to regain his/her balance.

Figure 16:
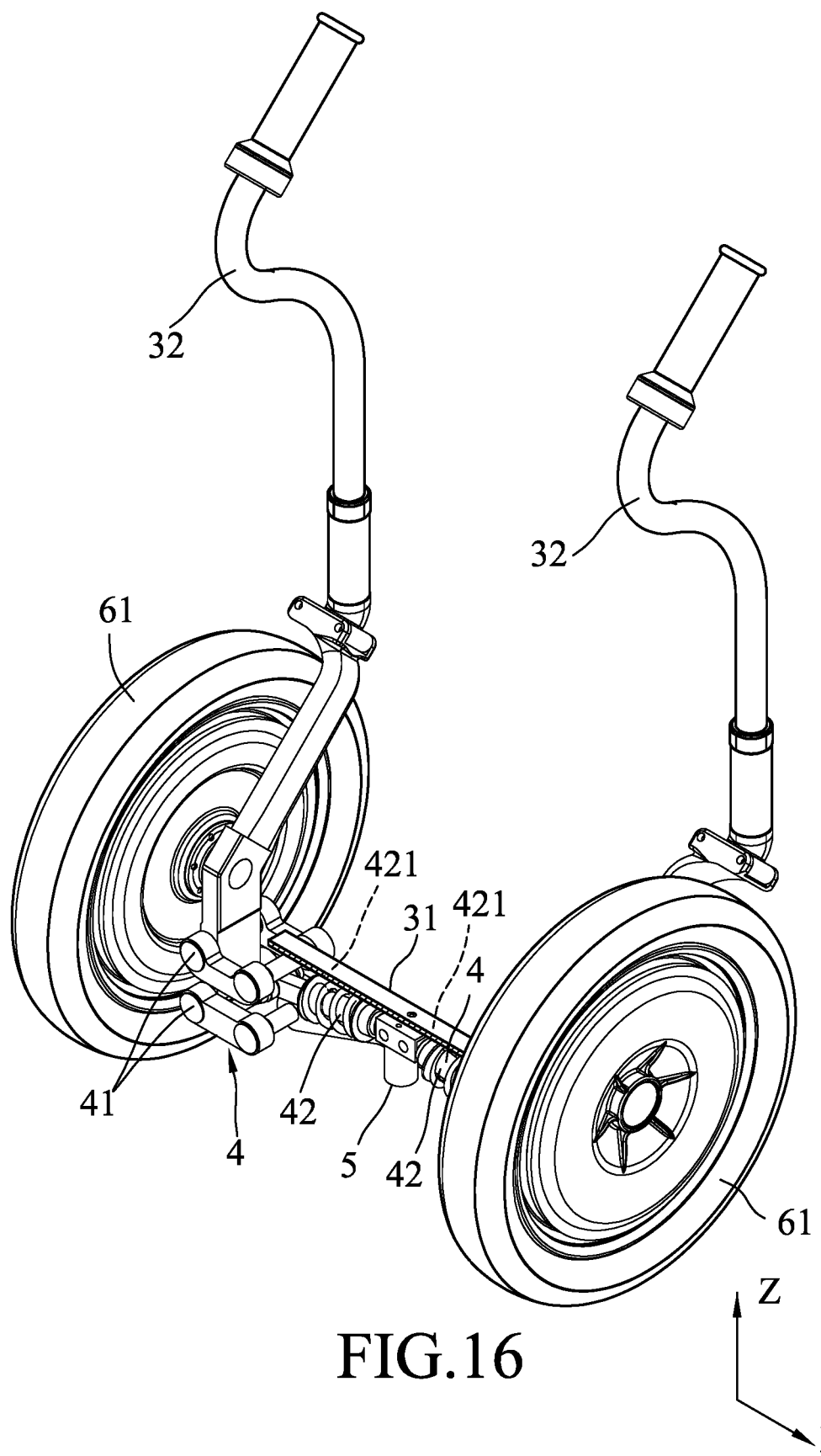
FIG. 16 is a perspective view of the balancing transporter according to an eighth embodiment of the present disclosure.

Referring to FIG. 16, the balancing transporter according to an eighth embodiment of the present disclosure is shown. The eighth embodiment is similar to the seventh embodiment and the difference therebetween resides in the structure of the shock absorbing modules 4 and the balance compensating module 5. In the eighth embodiment, the shock absorbers 42 are hydraulic shock absorbers. Each of the shock absorbers 42 has two ends that are opposite to each other in the first direction (X) and that are pivotally and respectively connected to the frame body 31 and one of the articulated rods 41 of the corresponding shock absorbing module 4 (only the articulated rods 41 of one of the shock absorbing modules 4 are visible in FIG. 16) so as to be compressed and extended by relative movements between the frame body 31 and the articulated rods 41.

The shock absorbers 42 each include a fluid tank 421 that is filled with hydraulic fluid. The fluid tanks 421 of the shock absorbers 42 communicate fluidly with each other through the balance compensating module 5. In this embodiment, the balance compensating module 5 is a hydraulic accumulator, is connected fixedly to the frame body 31, and permits the hydraulic fluid to flow between the fluid tanks 421.

For example, when the left one of the wheels 61 is raised, the articulated rods 411 of the left one of the shock absorbing modules 4 pivot relative to the frame body 31 upwardly and the left one of the shock absorbers 42 is compressed. At this time, the hydraulic fluid in the left one of the fluid tanks 421 flows into the right one of the fluid tanks 421 through the balance compensating module 5. Then, the right one of the shock absorbers 42 is extended to drive the articulated rods 411 of the right one of the shock absorbing modules 4 to pivot downwardly relative to the frame body 31, to thereby move the right one of the frame rods 32 together with the right one of the wheels 61 downwardly relative to the frame body 31. In this way, the frame body 31 is kept from tilting. It should be noted that fluid communication between the balance compensating module 5 and the fluid tanks 421 may be implemented by oil pipelines, and implementation of the same is not limited to the disclosure herein.

Figure 17:
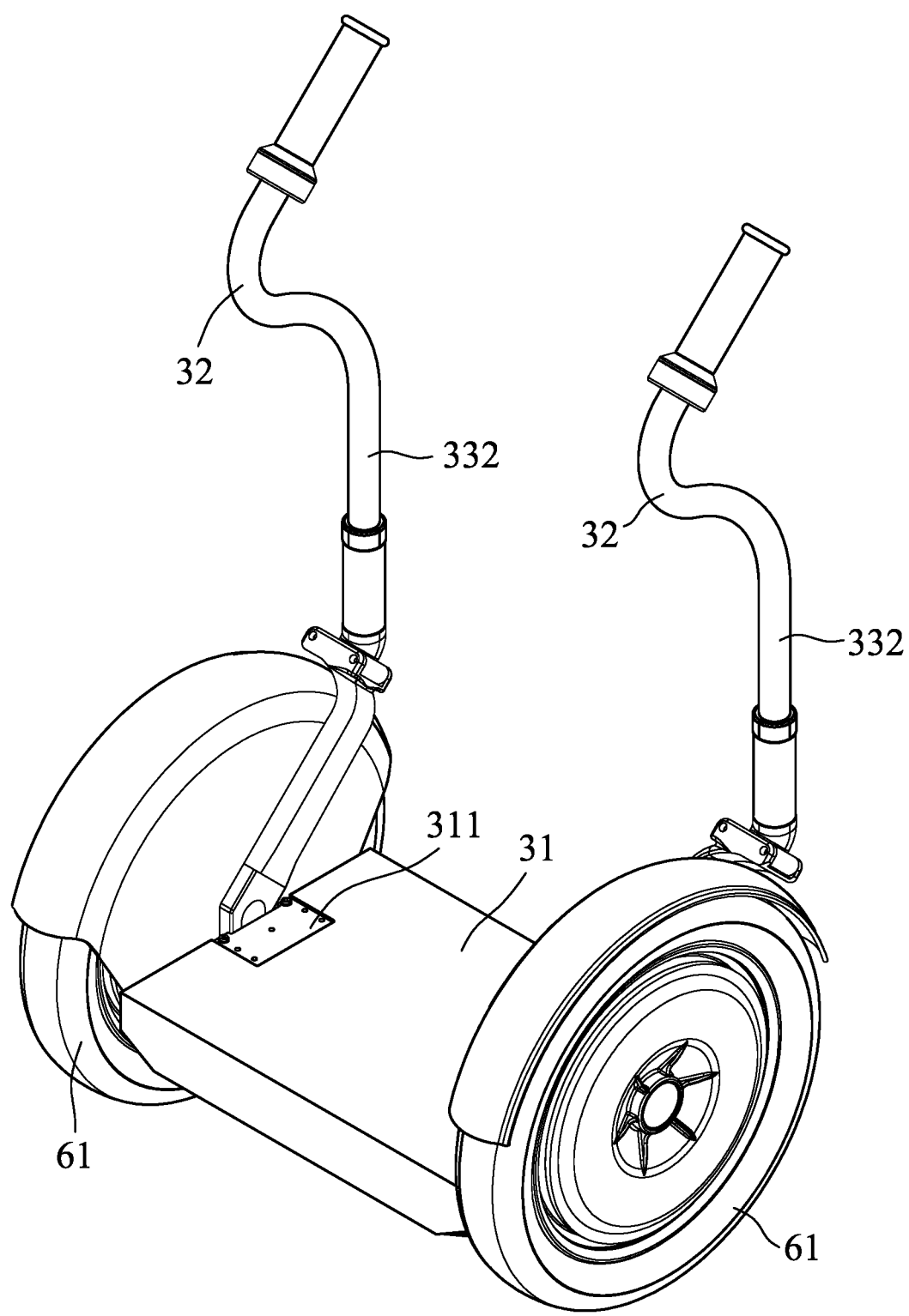
FIG. 17 is a perspective view of the balancing transporter according to a ninth embodiment of the present disclosure.
Figure 18:
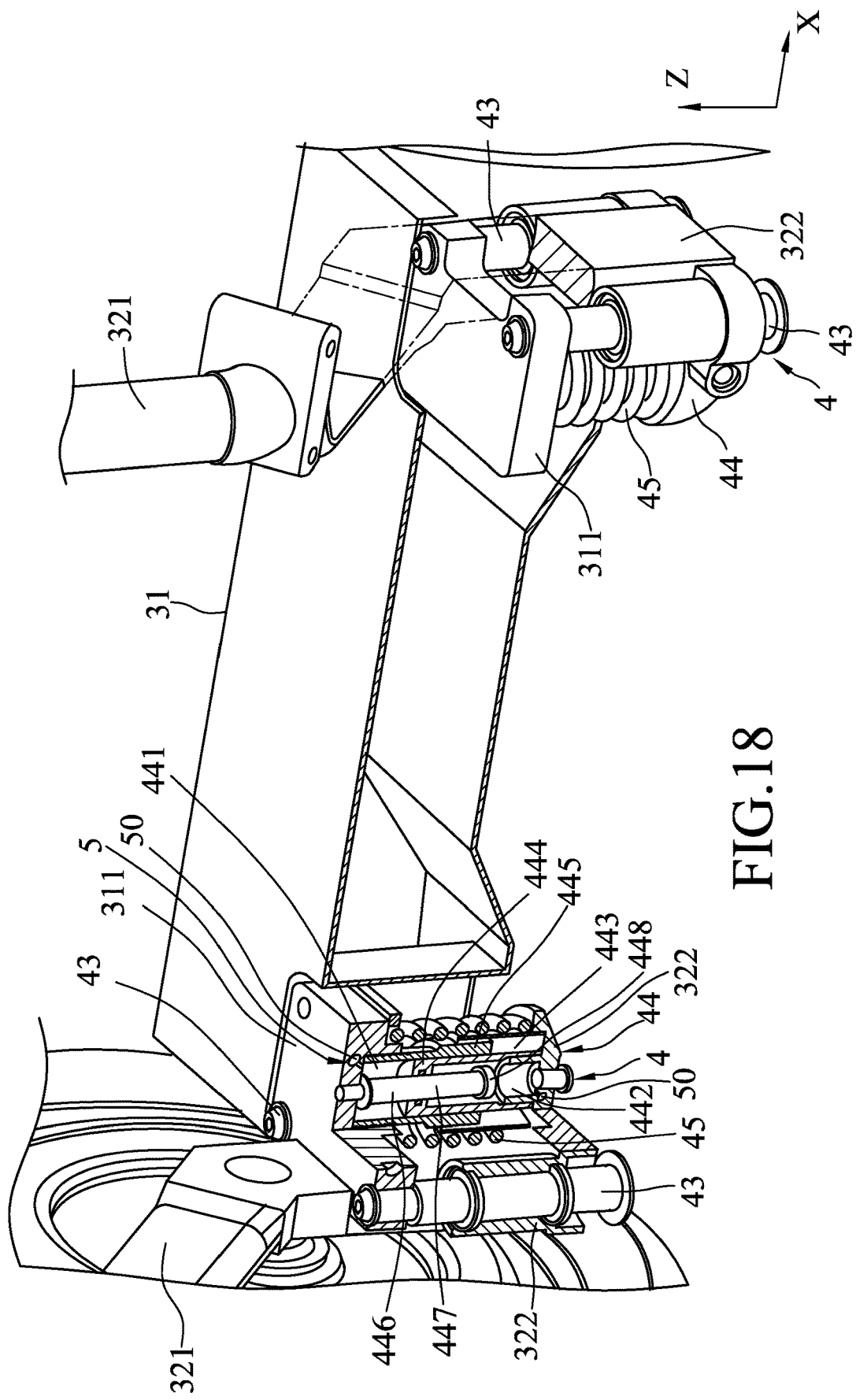
FIG. 18 is a fragmentary cutaway view of the balancing transporter of the ninth embodiment.
Figure 19:
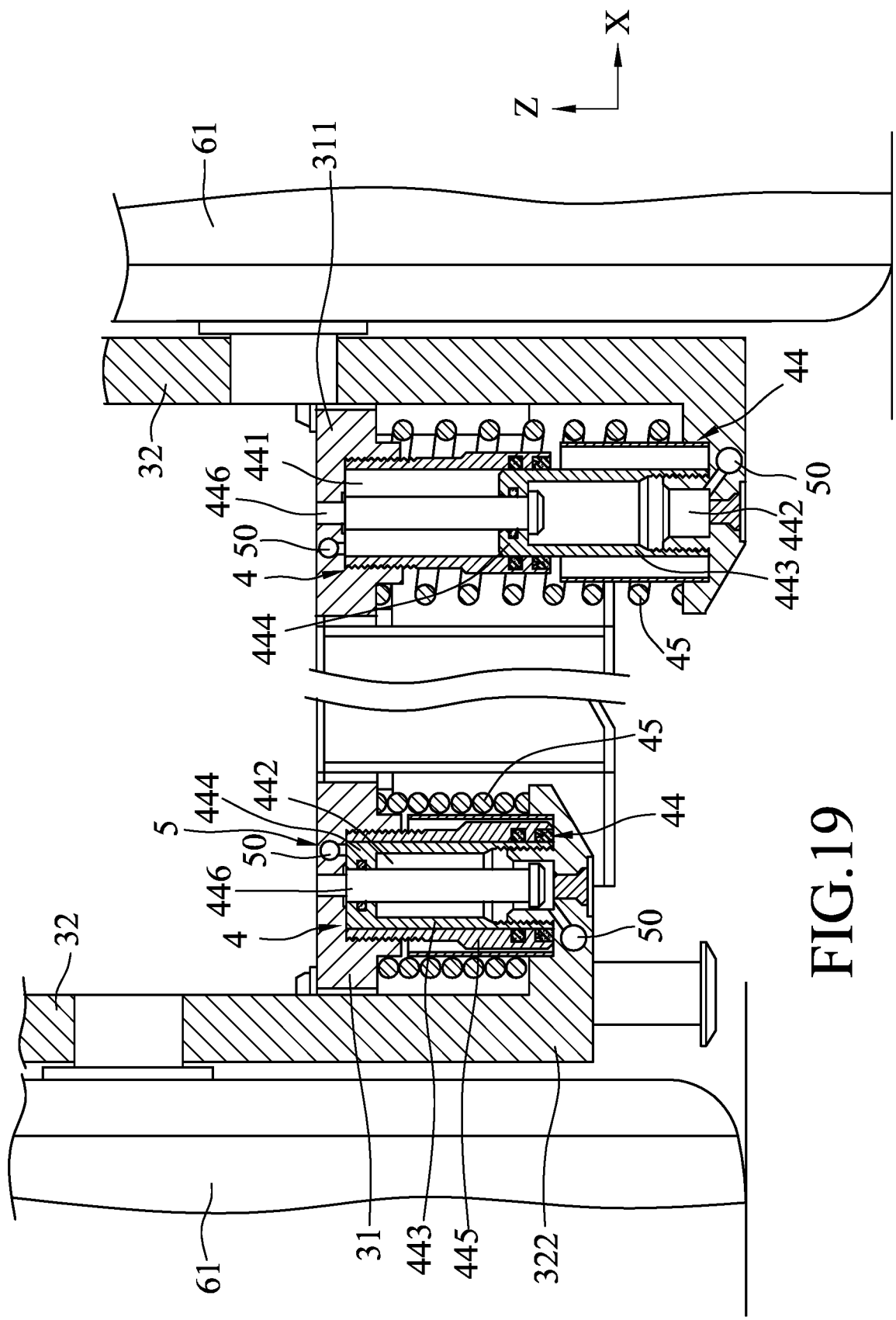
FIG. 19 is a schematic sectional view of the balancing transporter of the ninth embodiment, illustrating that a left wheel of the balancing transporter is raised.

Referring to FIGS. 17-19, the balancing transporter according to an ninth embodiment of the present disclosure is shown. The ninth embodiment is similar to the seventh embodiment and the difference therebetween resides in the structure of the shock absorbing modules 4 and the balance compensating module (shown in FIGS. 18 and 19).

In the ninth embodiment, each of the frame rods 32 includes a lower seat 322, and a rod body 321 which extends from the lower seat 322 substantially in the second direction (Z) and on which the respective one of the wheels 61 is mounted. The frame body 31 includes two support bases 311 spaced apart from each other in the first direction (X) and connected respectively to the shock absorbing modules 4. The balance compensating module 5 is connected fixedly to the frame body 31 and connected between the shock absorbing modules 4 in a fluidly communicated manner.

Each of the shock absorbing modules 4 includes two guiding pillars 43, a hydraulic cylinder 44 and a shock absorbing spring 45, all of which extend in the second direction (Z) and are disposed between the lower seat 322 of the respective one of the frame rods 32 and the respective one of the support bases 311. The guiding pillars 43 of each of the shock absorbing modules 4 guide the lower seat 322 of the respective one of the frame rods 32 to move relative to the respective one of the support bases 311. The shock absorbing spring 45 of each of the shock absorbing modules 4 is sleeved on the hydraulic cylinder 44 of the shock absorbing module 4, and has two ends that are opposite to each other in the second direction (Z) and that abut respectively against the lower seat 322 of the respective one of the frame rods 32 and the respective one of the support bases 311.

Note that since the structures of the shock absorbing modules 4 are the same, only one of the shock absorbing modules 4 will be described in the following description. The hydraulic cylinder 44 of the shock absorbing module 4 includes a lower barrel 443, an upper barrel 445, and a limiting rod 446.

The lower barrel 443 is connected fixedly to the lower seat 322 of the respective one of the frame rods 32, includes an upper end wall 444 opposite to the lower seat 322 of the respective one of the frame rods 32 in the second direction (Z), and cooperates with the lower seat 322 of the respective one of the frame rods 32 to define a lower tank 442. The upper barrel 445 is telescopically connected to and movable relative to the lower barrel 443 in an air tight manner, is connected fixedly to the respective one of the support bases 311, and cooperates with the lower barrel 443 and the respective one of the support bases 311 to define an upper tank 441. The upper and lower tanks 441, 442 are spaced apart from each other in the second direction (Z) and are filled with hydraulic fluid.

The limiting rod 446 includes a rod segment 447 and a head segment 448. The rod segment 447 is connected fixedly to and extends from the respective one of the support bases 311 through the upper barrel 445, and extends into the lower barrel 443 through the upper end wall 444 in an air tight manner. The head segment 448 is formed at a distal end of the limiting rod 446, has a diameter larger than that of the rod segment 447, is disposed in the lower barrel 443, and is operated to abut against the upper end wall 444.

In this embodiment, the balance compensating module 5 is implemented by a plurality of oil pipelines 50 that communicate hydraulic fluid between the upper tanks 441 of the respective hydraulic cylinders 44, and communicate hydraulic fluid between lower tanks 442 of the respective hydraulic cylinders 44. Note that the balance compensating module 5 is not limited to the example described above and implementation of the same is not limited to the disclosure herein.

As shown in FIG. 19, in a case that the left one of the wheels 61 is raised, the left one of the frame rods 32 is driven by the left one of the wheels 61 to move upwardly relative to the left one the support bases 311 in the second direction (Z). Accordingly, the lower seat 322 of the left one of the frame rods 32 moves upwardly to compress the absorbing spring 45 and the hydraulic cylinder 44 of the left one of the shock absorbing modules 4.

The relative movement between the left one of the support bases 311 and the lower seat 322 of the left one of the frame rods 32 changes a dimension of the left one of the hydraulic cylinders 44 so volumes of the upper and lower tanks 441 (see FIG. 18), 442 thereof are changed to drive the hydraulic fluid in each of the upper and lower tanks 441, 442 of the left one of the hydraulic cylinders 4 to flow into a respective one of the upper and lower tanks 441, 442 of the right one of the hydraulic cylinders 4 through the balance compensating module 5. In this way, the right one of the hydraulic cylinders 44 is extended to drive the lower seat 322 of the right one of the frame rods 32 together with the right one of the wheels 61 to move downwardly.

By virtue of the rigidity of the upper barrels 445 and the lower barrels 443 of the shock absorbing modules 4 and the balance compensating module 5, a downward moving distance of the right one of the wheels 61 is substantially the same as an upward moving distance of the left one of the wheels 61, and thus the frame body 31 (see FIG. 17) is kept from tilting when traveling on a bumpy road. Additionally, when, for example, the right one of the wheels 61 travels through a depression, the configuration of the shock absorbing modules 4 makes the corresponding one of the frame rods 32 gradually descend and thus the volumes of the upper and lower tanks 441, 442 of the right one of the hydraulic cylinders 44 are increased gradually to cause the hydraulic fluid in the upper and lower tanks 441 (see FIG. 18), 442 of the left one of the hydraulic cylinders 44 to flow respectively into the upper and lower tanks 441, 442 of the right one of the hydraulic cylinders 44. In this way, traveling stability of the balancing transporter may be promoted, and thus safety of the user operating the balancing transporter may be ensured.

Note that in the ninth embodiment, each of the shock absorbing modules 4 includes two guiding pillars 43, but the number of the guiding pillars 43 is not limited to the disclosure herein and may be one in other embodiments.

Figure 20:
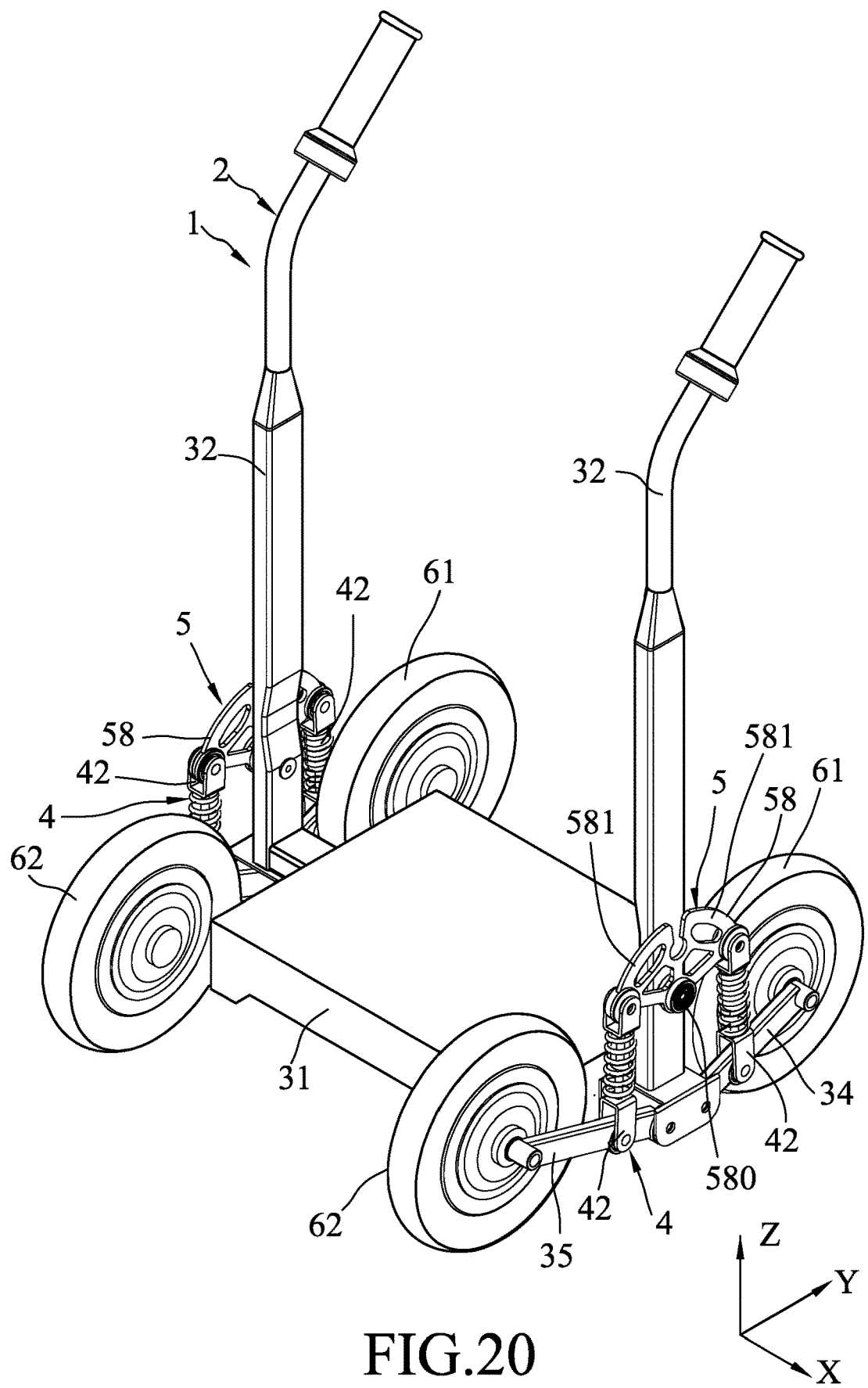
FIG. 20 is a perspective view of the balancing transporter according to a tenth embodiment of the present disclosure.

Referring to FIGS. 20 and 21, the balancing transporter according to a tenth embodiment of the present disclosure is shown. The tenth embodiment is similar to the seventh embodiment and the difference therebetween resides in the following.

In the tenth embodiment, the balancing transporter further includes a pair of rear wheels 62 spaced apart from each other in the first direction (X) and respectively spaced apart from the (front) wheels 61 in a third direction (Y) transverse to the first direction (X) and the second direction (Z). In this embodiment, the frame unit 2 includes, among other elements, a pair of front cranks 34 (only one is visible in FIG. 20), a pair of rear cranks 35 (only one is visible in FIG. 20), a pair of balance compensating modules 5 and a pair of shock absorbing modules 4.

The front cranks 34 are mounted pivotally and respectively to the frame rods 32, and the front wheels 61 are mounted rotatably and respectively to the front cranks 34. The rear cranks 35 are mounted pivotally and respectively to the frame rods 32, and the rear wheels 62 are mounted rotatably and respectively to the rear cranks 35.

The balance compensating modules 5 each includes an arm 58 mounted pivotally to a respective one of the frame rods 32. The arm 58 of each of the balance compensating modules 5 includes a pair of eccentric arm portions 581 that extend from a pivot center 580 where the arm 58 is pivotally connected to the respective one of the frame rods 32 and that are opposite to each other in the third direction (Y).

The shock absorbing modules 4 are mounted respectively to the balance compensating modules 5 and are connected to the front cranks 34 and the rear cranks 35. Each of the shock absorbing modules 4 includes a pair of shock absorbers 42 that are respectively and pivotally connected to and extend from the respective one of the front cranks 34 and the respective one of the rear cranks 35 in the second direction (Z), and that are respectively connected to the eccentric arm portions 581 of a respective one of the arms 58. In this way, the shock absorbing modules 4 and the balance compensating modules 5 cooperate with the front cranks 34 and the rear cranks 35 to constitute a four-bar linkage structure.

When the balancing transporter of the tenth embodiment travels on a ramp, the front wheels 61 are raised at the same time and the front cranks 34 pivot respectively relative to the frame rods 32 upwardly, so that the front two of the shock absorbers 42 respectively of the shock absorbing modules 4 are pushed upwardly to drive the arms 58 to turn backwardly about the pivot centers 580, respectively. At this time, the arms 58 push the rear two of the shock absorbers 42 respectively of the shock absorbing modules 4 to drive the rear cranks 35 to pivot downwardly relative to the frame rods 32 so the rear wheels 62 are brought to move downwardly relative to the frame body 31 to keep the frame body 31 from tilting.

Figure 22:
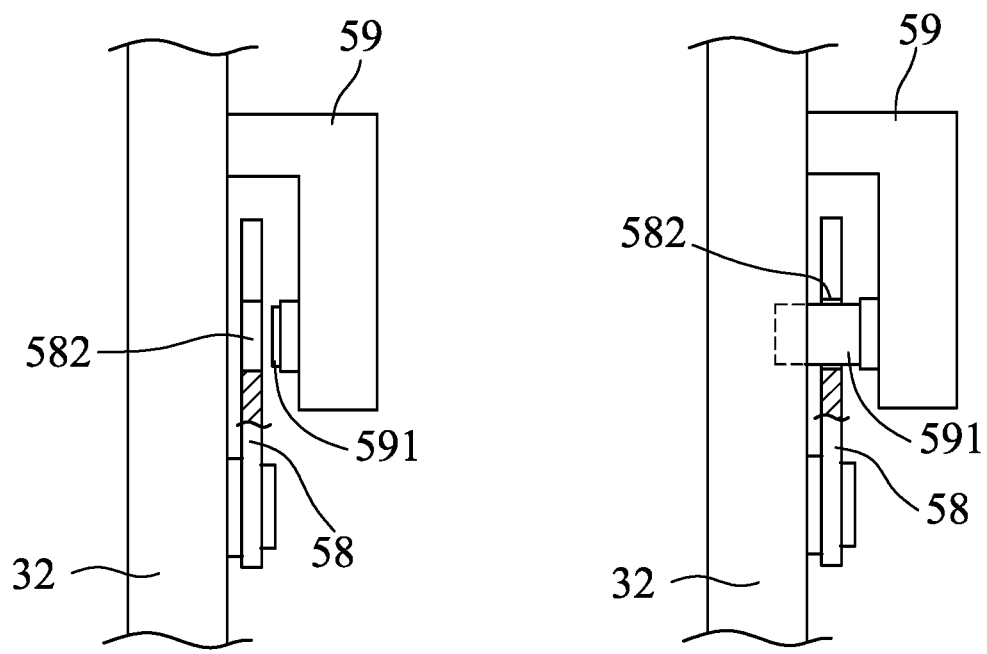
FIG. 22 presents fragmentary schematic side views illustrating a pin of an anti-rolling unit of the balancing transporter being at an unlock position and a locked position.

Further referring to FIG. 22, each of the arms 58 is formed with an engaging hole 582 extending through the arm 58 in the first direction (X). The frame unit 2 further includes a pair of anti-rolling units 59 (only one is depicted) connected fixedly and respectively to the frame rods 32. Each of the anti-rolling units 59 includes a positioning pin 591 operable to move between an unlock position (see the left of FIG. 22) and a locked position (see the right of FIG. 22). When the positioning pin 591 is in the unlock position, pivoting movement of the arm 58 of a respective one of the balance compensating modules 5 relative to the respective one of the frame rods 32 is permitted. When the positioning pin 591 is in the locked position, the positioning pin 591 extends into and engages the engaging hole 582 of the arm 58 of the respective one of the balance compensating modules 5 so as to arrest the pivoting movement of the arm 58 relative to the respective one of the frame rods 32. At this time, the balance compensation function provided by the respective balance compensating module 5 is temporarily disabled so that upward/downward movement of a corresponding front wheel 61 would not induce upward/downward movement of the corresponding rear wheel 62, or vice versa. In this way, the balancing transporter may be kept steady to allow the user to get on or off the balancing transportation with ease.

Figure 23:
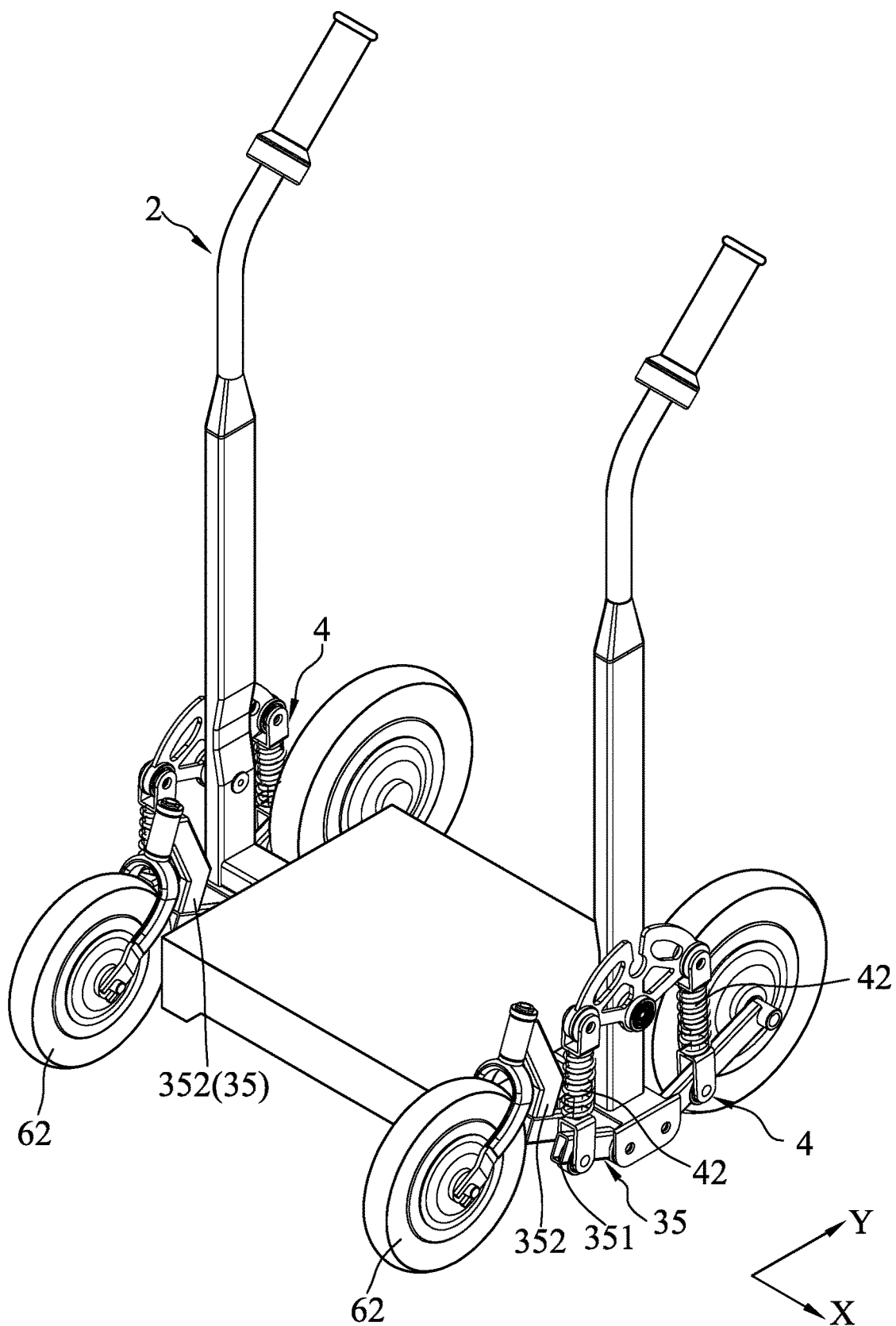
FIG. 23 is a perspective view of the balancing transporter according to an eleventh embodiment of the present disclosure.

Referring to FIG. 23, the balancing transporter according to an eleventh embodiment of the present disclosure is shown. The eleventh embodiment is similar to the tenth embodiment and the difference therebetween resides in the structure of the frame unit 2.

In the eleventh embodiment, each of the rear cranks 35 of the frame unit 2 includes a crank portion 351 and a fork 352 that are spaced apart from each other in the first direction (X) and that extend in the third direction (Y). The crank portion 351 is pivotally connected to a corresponding one of the shock absorbers 42 of a respective one of the shock absorbing modules 4. Each of the rear wheels 62 is rotatably connected to the fork 352 of a respective one of the rear cranks 35 in such a manner that yaw movement of the rear wheel 62 is allowed. In this way, the configuration of the rear cranks 35 facilitates turning of the balancing vehicle in a relatively smooth manner.

It should be noted that in each of the seventh to the eleventh embodiments, the frame unit 2 includes two frame rods 32 respectively including the handles 331 for the user to hold but the present disclosure is not limited to these embodiments. For example, the frame unit 2 may include only one frame rod 32 fixed on the frame body 31 and mounted with a handle bar 33 for the user to hold. Additionally, the shock absorbing modules 4 and the balance compensating module(s) 5 disclosed in the seventh to the eleventh embodiments may be adapted for the balancing transporter of the first to the sixth embodiment.

To sum up, the variety of embodiments of the balancing transporter described above have capabilities of tracing and preventing source or errors and post-error correction and revealed a safer management to mitigate occurrence of undesired abrupt turn and dangerous falling of a user. Specifically, allowing the user to use his/her wrists to operate the adjusting members 75 while leaving both arms free to keep balance without interfering with wrist operations, the frame rod 32 is able to provide a firm support for the user and also makes riding safer. By means of engineering the main control system 96 to be able to set an user-acknowledged maximum-allowable differential speed of the wheels 61 through the user interface 95 and to cooperate with the rotating sensors 741 to further tune the above-mentioned differential speed output more smoothly and friendly to user, those abrupt turning dangerous to the user can be avoided completely.

By adopting the configurations of the shock absorbing modules 4 and the balance compensating module(s) 5, the balancing transporter can be kept from serious lateral tilting and provides a pair of non-swiveling frame rod(s) 32 to assist the user in keeping balance so that the user would not lose balance even when riding on a rugged road.

By virtue of the abovementioned configurations, the balancing transporter of the present disclosure is relatively safer than the conventional balancing transporters mentioned.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A balancing transporter comprising:
   a vehicle frame including a frame unit and a pair of wheels spaced apart from each other and rotatably mounted to opposite sides of said frame unit, said frame unit including two spaced-apart handles;
   a turning control mechanism including two adjusting members rotatably and respectively sleeved on said handles, and a rotational sensor unit mounted on said frame unit for sensing a rotation angle of at least one of said adjusting members relative to the respective one of said handles and outputting a rotation angle signal indicating the rotation angle; and a main control system communicatively connected to said rotational sensor unit and said wheels, and including
a control sub-system configured to continuously obtain a current speed of each of said wheels in real time, and
a storage device storing a data set that includes a plurality of wheel speeds and a plurality of maximum allowances of difference between speeds of said wheels corresponding respectively to the wheel speeds,
said control sub-system further configured to determine one of the maximum allowances corresponding to one of the wheel speeds that matches a smaller one of the current speeds of said wheels, and to control a difference between speeds of said wheels according to an actual allowance of difference between speeds of said wheels that is a product of an adjusting ratio associated with the rotation angle and the one of the maximum allowances thus determined.

2. The balancing transporter as claimed in claim 1, wherein said turning control mechanism further includes two switches mounted respectively to said handles, said rotational sensor unit including:
two rotational sensors communicatively and respectively connected to said switches and configured to respectively sense, in response to being respectively triggered by said switches that are operated, the rotations of said adjusting members respectively relative to said handles, each of said rotational sensors outputting a rotation angle signal indicating the respective one of the rotation angles; and
a processor communicatively connected to said rotational sensors for receiving the rotation angle signals, determining, based on the rotation angle signal received from one of said rotational sensors that is triggered by a corresponding one of said switches operated earlier, the rotation angle of one of said adjusting members corresponding to the one of said rotational sensors that is triggered by the corresponding one of said switches operated earlier, and determining an adjusting ratio by analyzing the rotation angle indicated by the rotation angle signal received from the one of said rotational sensors.

3. The balancing transporter as claimed in claim 1, wherein said storage device storing a plurality of the data sets each including a plurality of wheel speeds and a plurality of maximum allowances of difference between speeds of said wheels corresponding respectively to the wheel speeds, the balancing transporter further comprising a user interface operable to select one of the data sets, said control sub-system further configured to determine, based on one of the preference data sets thus selected, one of the maximum allowances corresponding to one of the wheel speeds that matches a smaller one of the current speeds of said wheels.

4. A balancing transporter comprising:
a vehicle frame including a frame unit and a pair of wheels spaced apart from each other and rotatably mounted to opposite sides of said frame unit, said frame unit including two spaced-apart handles;
a turning control mechanism including two adjusting members rotatably and respectively sleeved on said handles, and a rotational sensor unit mounted on said frame unit for sensing a rotation angle of at least one of said adjusting members relative to the respective one of said handles and outputting a rotation angle signal indicating the rotation angle; and
a main control system communicatively connected to said rotational sensor unit and said wheels, and including
a control sub-system configured to continuously obtain a current speed of each of said wheels in real time, and
a storage device storing a data set that includes a plurality of wheel speeds and a plurality of maximum allowances of difference between speeds of said wheels corresponding respectively to the wheel speeds,
said control sub-system further configured to determine one of the maximum allowances corresponding to one of the wheel speeds that matches a smaller one of the current speeds of said wheels, and to control a difference between speeds of said wheels according to an actual allowance of difference between speeds of said wheels that is a product of an adjusting ratio associated with the rotation angle and the one of the maximum allowances thus determined;
wherein said turning control mechanism further includes two switches mounted respectively to said handles, said rotational sensor unit including:
two rotational sensors communicatively and respectively connected to said switches and configured to respectively sense, in response to being respectively triggered by said switches that are operated, the rotations of said adjusting members respectively relative to said handles, each of said rotational sensors outputting a rotation angle signal indicating the respective one of the rotation angles; and
a processor communicatively connected to said rotational sensors for receiving the rotation angle signals, determining, based on the rotation angle signal received from one of said rotational sensors that is triggered by a corresponding one of said switches operated earlier, the rotation angle of one of said adjusting members corresponding to the one of said rotational sensors that is triggered by the corresponding one of said switches operated earlier, and determining an adjusting ratio by analyzing the rotation angle indicated by the rotation angle signal received from the one of said rotational sensors.

* * * * *